(12) United States Patent
Aikawa et al.

(10) Patent No.: US 10,017,658 B2
(45) Date of Patent: Jul. 10, 2018

(54) AQUEOUS COATING COMPOSITION, AQUEOUS COATING MATERIAL KIT AND ARTICLE HAVING COATED FILM

(71) Applicant: ASAHI GLASS COMPANY, LIMITED, Tokyo (JP)

(72) Inventors: Masataka Aikawa, Tokyo (JP); Shun Saito, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 145 days.

(21) Appl. No.: 14/923,465

(22) Filed: Oct. 27, 2015

(65) Prior Publication Data

US 2016/0046821 A1 Feb. 18, 2016

Related U.S. Application Data

(63) Continuation of application No. PCT/JP2014/063618, filed on May 22, 2014.

(30) Foreign Application Priority Data

May 27, 2013 (JP) .................................. 2013-110885

(51) Int. Cl.
| | |
|---|---|
| *C08G 18/28* | (2006.01) |
| *C08G 18/32* | (2006.01) |
| *C08G 18/62* | (2006.01) |
| *C08G 18/64* | (2006.01) |
| *C08G 18/70* | (2006.01) |
| *C08G 18/73* | (2006.01) |
| *C09D 5/00* | (2006.01) |
| *C09D 5/02* | (2006.01) |
| *C09D 5/16* | (2006.01) |
| *C09D 127/12* | (2006.01) |
| *C09D 151/06* | (2006.01) |
| *C09D 157/08* | (2006.01) |
| *C09D 175/04* | (2006.01) |
| *C09D 175/08* | (2006.01) |
| *C09D 201/00* | (2006.01) |

(52) U.S. Cl.
CPC ......... *C09D 127/12* (2013.01); *C08G 18/284* (2013.01); *C08G 18/3206* (2013.01); *C08G 18/6279* (2013.01); *C08G 18/6415* (2013.01); *C08G 18/706* (2013.01); *C08G 18/73* (2013.01); *C09D 5/00* (2013.01); *C09D 5/02* (2013.01); *C09D 5/16* (2013.01); *C09D 151/06* (2013.01); *C09D 157/08* (2013.01); *C09D 175/04* (2013.01); *C09D 175/08* (2013.01); *C09D 201/00* (2013.01)

(58) Field of Classification Search
CPC .............. C08G 18/3206; C08G 18/284; C08G 18/6279; C08G 18/6415; C08G 18/706; C08G 18/73; C09D 5/02; C09D 5/16; C09D 151/06; C09D 157/08; C09D 175/08; C09D 201/00; C09D 175/04; C09D 127/12; C09D 5/00
See application file for complete search history.

(56) References Cited

U.S. PATENT DOCUMENTS

| | | | | |
|---|---|---|---|---|
| 5,852,106 | A | * | 12/1998 | Wilmes ................ C03C 17/322 428/423.1 |
| 2005/0137355 | A1 | | 6/2005 | Buckanin et al. |
| 2010/0167847 | A1 | | 7/2010 | Tarao et al. |
| 2011/0105247 | A1 | | 5/2011 | Tarao et al. |

FOREIGN PATENT DOCUMENTS

| | | |
|---|---|---|
| EP | 4593720 | * 11/2005 |
| JP | 59-179670 | 10/1984 |
| JP | 9-227804 | 9/1997 |
| JP | 10-212404 | 8/1998 |
| JP | 2000-119551 | 4/2000 |
| JP | 3073775 | 8/2000 |
| JP | 2001-72928 | 3/2001 |
| JP | 2007-514861 | 6/2007 |
| JP | 2008-284408 | 11/2008 |
| JP | 2010-155927 | 7/2010 |
| JP | 2011-92578 | 5/2011 |
| JP | 2012-77225 | 4/2012 |
| WO | WO 2013/158360 A1 | 10/2013 |

OTHER PUBLICATIONS

International Search Report dated Aug. 12, 2014 in PCT/JP2014/063618 filed May 22, 2014.
Office Action dated Apr. 3, 2018, in Japanese Patent Application No. 2015-519824 (with English Translation).

* cited by examiner

*Primary Examiner* — Patrick Niland
(74) *Attorney, Agent, or Firm* — Oblon, McClelland, Maier & Neustadt, L.L.P.

(57) ABSTRACT

To provide an aqueous coating composition with which a coating film having a sufficient self-cleaning function can be formed even in a case where an aqueous fluorinated resin dispersion is blended as an aqueous synthetic resin dispersion or a case where an isocyanate compound is contained as a curing agent can be formed; an aqueous coating material kit with which the aqueous coating composition can be obtained; and an article having a coated film having a sufficient self-cleaning function.

An aqueous coating composition, which comprises an aqueous synthetic resin dispersion and a urethane polyol, wherein the urethane polyol is a reaction product of a polyoxyalkylene diol having as units an oxyalkylene group of a structure such that an oxygen atom is bonded to one end of a branched alkylene group, and an aliphatic diisocyanate.

20 Claims, No Drawings

US 10,017,658 B2

AQUEOUS COATING COMPOSITION, AQUEOUS COATING MATERIAL KIT AND ARTICLE HAVING COATED FILM

This application is a continuation of PCT Application No. PCT/JP2014/063618 filed on May 22, 2014, which is based upon and claims the benefit of priority from Japanese Patent Application No. 2013-110885 filed on May 27, 2013. The contents of those applications are incorporated herein by reference in their entireties.

TECHNICAL FIELD

The present invention relates to an aqueous coating composition, an aqueous coating material kit, and an article having a coated layer formed by using the aqueous coating composition.

BACKGROUND ART

In order to impart to a coated film self-cleaning function such as antifouling property or easy washing property, it is common to add to a coating composition a stain-proofing agent capable of imparting hydrophilicity and oil repellency to the surface of the coated film. Further, in view of environmental aspect, it has been desired to realize the self-cleaning function with an aqueous coating material having a low content of organic solvents.

The following have been proposed as an aqueous coating composition containing a stain-proofing agent for an aqueous coating material.

(1) An aqueous coating composition comprising a synthetic resin emulsion and an alkoxysilane modified condensate as a stain-proofing agent for an aqueous coating material (Patent Document 1).

(2) An aqueous coating composition comprising an aqueous synthetic resin dispersion and as a stain-proofing agent for an aqueous coating material, a fluorinated copolymer having (meth)acrylate units having a $C_{1-6}$ perfluoroalkyl group, (meth)acrylate units having a poly(alkylene oxide) chain, and (meth)acrylate units having a dialkylamino group (Patent Document 2).

However, the aqueous coating composition (1) contains an alkoxysilane modified condensate having a relatively high reactivity, and is thereby problematic in the storage stability.

The aqueous coating composition (2) has favorable storage stability, however, in a case where it contains an aqueous fluorinated resin dispersion as the aqueous synthetic resin dispersion, the fluorinated copolymer as the stain-proofing agent is less likely to migrate to the surface layer of the coated film, and the self-cleaning function may not sufficiently be imparted. Particularly if it contains an isocyanate compound as a curing agent, the fluorinated copolymer reacts with the isocyanate compound in the process of migrating to the surface layer of the coated film, and the fluorinated copolymer is still less likely to migrate to the surface layer of the coated film.

PRIOR ART DOCUMENTS

Patent Documents

Patent Document 1: Japanese Patent No. 3073775
Patent Document 2: JP-A-2012-077225

DISCLOSURE OF INVENTION

Technical Problem

The present invention provides an aqueous coating composition with which a coated film having a sufficient self-cleaning function even in a case where an aqueous fluorinated resin dispersion is blended as an aqueous synthetic resin dispersion or a case where an isocyanate compound is contained as a curing agent can be formed; an aqueous coating material kit with which the aqueous coating composition can be obtained; and an article having a coated film having a sufficient self-cleaning function.

Solution to Problem

The aqueous coating composition of the present invention comprises an aqueous synthetic resin dispersion and a urethane polyol, wherein the urethane polyol is a reaction product of a polyoxyalkylene diol having as units an oxyalkylene group of a structure such that an oxygen atom is bonded to one end of a branched alkylene group, and an aliphatic diisocyanate.

The oxyalkylene group is preferably an oxypropylene group.

The urethane polyol is preferably a reaction product of a polypropylene glycol having from 2 to 6 oxypropylene groups and an alkylene diisocyanate having a $C_{4-10}$ alkylene group.

The alkylene group of the alkylene diisocyanate is preferably a branched alkylene group.

The urethane polyol preferably has a number average molecular weight of from 1,000 to 30,000 and a hydroxy value of from 50 to 500 mgKOH/g.

The content of the urethane polyol is preferably from 0.5 to 30 parts by mass per 100 parts by mass of the solid content in the aqueous synthetic resin dispersion.

It is preferred that at least part of the synthetic resin in the aqueous synthetic resin dispersion is a fluorinated resin.

The fluorinated resin in the aqueous fluorinated resin dispersion is preferably a fluorinated copolymer (A1p) having structural units based on the following monomer (m1), structural units based on the following monomer (m2) and structural units based on the following monomer (m3), or a fluorinated copolymer (A2p) having from 40 to 60 mol % of structural units represented by the following formula (a1), from 3 to 50 mol % of structural units represented by the following formula (a2), from 4 to 30 mol % of structural units represented by the following formula (a3) and from 0.4 to 7 mol % of structural units represented by the following formula (a4) (provided that the total amount of the structural units represented by the formula (a1), the structural units represented by the formula (a2), the structural units represented by the formula (a3) and the structural units represented by the formula (a4) is from 80 to 100 mol %).

monomer (m1): a fluoroolefin,
monomer (m2): a macromonomer having a hydrophilic moiety, and
monomer (m3): a hydroxy group-containing monomer represented by the following formula (m3):

$$R^1\text{---}R^2\text{---}OH \qquad (m3)$$

wherein $R^1$ is a group having a radical polymerizable unsaturated group, and $R^2$ is a n-nonylene group or a cyclohexane-1,4-dimethylene group.

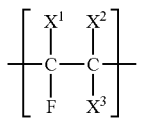
(a1)

wherein each of $X^1$ and $X^2$ which are independent of each other, is a hydrogen atom, a chlorine atom or a fluorine atom, $X^3$ is a hydrogen atom, a chlorine atom, a fluorine atom or —$CY^1Y^2Y^3$, and each of $Y^1$, $Y^2$ and $Y^3$ which are independent of one another, is a hydrogen atom, a chlorine atom or a fluorine atom,

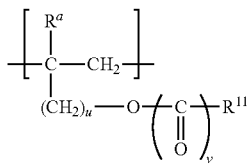
(a2)

wherein $R^a$ is a hydrogen atom or a methyl group, $R^{11}$ is a $C_{1-12}$ alkyl group or a $C_{4-10}$ monovalent alicyclic group, u is an integer of from 0 to 8, and v is 0 or 1,

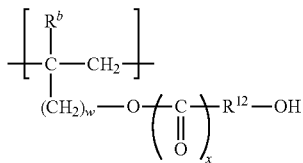
(a3)

wherein $R^b$ is a hydrogen atom or a methyl group, $R^{12}$ is a $C_{1-10}$ alkylene group or a $C_{4-10}$ bivalent alicyclic group, w is an integer of from 0 to 8, and x is 0 or 1,

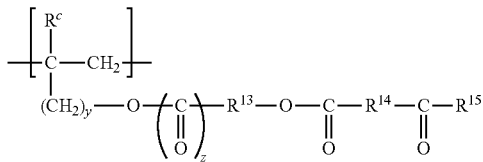
(a4)

wherein $R^c$ is a hydrogen atom or a methyl group, $R^{13}$ is a $C_{1-10}$ alkylene group or a $C_{4-10}$ bivalent alicyclic group, $R^{14}$ is a $C_{2-10}$ alkylene group or a $C_{4-10}$ bivalent alicyclic group, $R^{15}$ is —OH or —$O^{-+}NHZ^1Z^2Z^3$, each of $Z^1$, $Z^2$ and $Z^3$ which are independent of one another, is a hydrogen atom, a $C_{1-4}$ alkyl group or a $C_{1-6}$ hydroxyalkyl group, at least some of $R^{15}$ are —$O^{-+}NHZ^1Z^2Z^3$, y is an integer of form 0 to 8, and z is 0 or 1.

The aqueous fluorinated resin dispersion preferably further contains a curing agent.

The curing agent is preferably an isocyanate compound.

The article of the present invention has a coated film formed by using the aqueous coating composition of the present invention.

The aqueous coating material kit of the present invention comprises the aqueous coating composition of the present invention and an aqueous solution or aqueous dispersion of an isocyanate compound.

Further, the article of the present invention has a coated film formed by using the aqueous coating material kit.

The kit for preparation of an aqueous coating material of the present invention is a kit to be used to prepare the aqueous coating composition and comprises the aqueous synthetic resin dispersion and an aqueous solution or aqueous dispersion of the urethane polyol.

ADVANTAGEOUS EFFECTS OF INVENTION

According to the aqueous coating composition of the present invention, it is possible to form a coated film having a sufficient self-cleaning function even in a case where an aqueous fluorinated resin dispersion is blended as an aqueous synthetic resin dispersion or a case where an isocyanate compound is contained as a curing agent.

According to the aqueous coating material kit of the present invention, it is possible to obtain an aqueous coating composition which has the above effects.

The article of the present invention has a coated film having a sufficient self-cleaning function.

DESCRIPTION OF EMBODIMENTS

The following definitions of terms in this specification are applicable to this specification and claims.

"Structural units" mean units derived from a monomer formed by polymerization of the monomer. The units may be units directly formed by the polymerization reaction, or may be units having part of the units converted to another structure by treating the polymer.

"A monomer" means a compound having a radical polymerizable unsaturated group.

"A (meth)acrylate" means either one or both of an acrylate and a methacrylate.

"An aqueous medium" means a liquid containing water and having a content of an organic solvent of at most 3 mass %.

"A macromonomer" means a low molecular weight polymer or oligomer having a radical polymerizable unsaturated group on one terminal.

"A hydrophilic moiety" means a moiety having a hydrophilic group, a moiety having a hydrophilic bond, or a moiety comprising a combination thereof.

<Aqueous Coating Composition>

The aqueous coating composition of the present invention comprises an aqueous synthetic resin dispersion and a urethane polyol as a stain-proofing agent for an aqueous coating material.

The aqueous coating composition of the present invention is obtained, for example, by blending an aqueous synthetic resin dispersion and a urethane polyol.

(Urethane Polyol)

The urethane polyol in the present invention is a compound having a urethane bond in its molecule and having at least two hydroxy groups.

The urethane polyol in the present invention is considered to migrate, when the aqueous coating composition forms a coated film, to the surface of the coated film to impart hydrophilicity to the coated film surface and impart a self-cleaning function to the coated film.

The urethane polyol contained in the aqueous coating composition of the present invention is a reaction product of a polyoxyalkylene diol having as units an oxyalkylene group of a structure such that an oxygen atom is bonded to one end of a branched alkylene group, and an aliphatic diisocyanate, whereby the effects of the present invention will sufficiently be obtained.

Hereinafter, the above urethane polyol in the present invention will sometimes be referred to as a urethane polyol (X), the above polyoxyalkylene diol will sometimes be referred to as a polyoxyalkylene diol (Y), and an oxyalkylene group of a structure such that an oxygen atom is bonded to one end of a branched alkylene group will sometimes be referred to as a branched alkylene group.

The polyoxyalkylene diol (Y) is a polyoxyalkylene diol having as units an oxyalkylene group of a structure such that an oxygen atom is bonded to one end of a branched alkylene group. The polyoxyalkylene diol (Y) may have, as the oxyalkylene groups, only branched oxyalkylene groups, or may have branched oxyalkylene groups and oxyalkylene groups other than the branched oxyalkylene groups (hereinafter sometimes referred to as straight chain oxyalkylene groups) as well. Preferably, the polyoxyalkylene diol (Y) contains as the oxyalkylene groups only branched oxyalkylene groups.

The branched oxyalkylene group preferably has from 3 to 6 carbon atoms, more preferably 3 or 4 carbon atoms. The straight chain oxyalkylene group preferably has from 2 to 6 carbon atoms, more preferably 2 or 6 carbon atoms.

The oxyalkylene groups are preferably ones formed by ring opening of a cyclic ether or ones formed by oligomerization of an alkylene diol. The cyclic ether is preferably an alkylene oxide.

The alkylene oxide to form the branched oxyalkylene groups may, for example, be propylene oxide (i.e. 1,2-epoxypropane), 1,2-epoxybutane or 2,3-epoxybutane. A particularly preferred branched oxyalkylene group is an oxypropylene group formed by ring opening of propylene oxide.

The alkylene oxide to form the straight chain oxyalkylene groups may be ethylene oxide, and the cyclic ether other than the alkylene oxide to form the straight chain oxyalkylene groups may, for example, be oxetane or tetrahydrofuran. Preferred straight chain oxyalkylene groups are oxyethylene groups formed by ring opening of ethylene oxide.

The polyoxyalkylene diol is a compound having at least two oxyalkylene groups and having two hydroxy groups. The polyoxyalkylene diol may be produced e.g. by a method of reacting water with an alkylene oxide or a method of subjecting an alkylene oxide to ring-opening addition to a bivalent initiator.

By the method of reacting water with an alkylene oxide, a polyoxyalkylene diol which is a multimer of an alkanediol. In this specification, the number of oxyalkylene groups of the polyoxyalkylene diol which is a multimer of an alkanediol means the number of alkanediol residues. For example, the number of oxyalkylene groups of an alkanediol such as propylene glycol, ethylene glycol or 1,4-butanediol is 1, and the number of oxyalkylene groups of a multimer thereof is 2 or more. Specifically, for example, the number of oxypropylene groups of dipropylene glycol is 2, the number of oxypropylene groups of tripropylene glycol is 3, and the number of oxypropylene groups of tetrapropylene glycol is 4.

By a method of subjecting an alkylene oxide to ring-opening addition to a bivalent initiation such as a dihydric alcohol, a polyoxyalkylene diol having a residue of the bivalent initiator and an oxyalkylene group forms. In a case where the bivalent initiator is an alkanediol, the residue of the bivalent initiator is an oxyalkylene group, and in a case where the bivalent initiator is a multimer of an alkanediol, the residue of the bivalent initiator has the above number of oxyalkylene groups. In a case where the initiator is a propylene glycol monomer or multimer such as propylene glycol or dipropylene glycol, by subjecting propylene oxide to ring-opening addition to the initiator, a polyoxypropylene diol having the same structure as the multimer of the propylene glycol forms.

The polyoxyalkylene diol (Y) may be a single polyoxyalkylene diol or a mixture of two or more polyoxyalkylene diols. In the case of a mixture, the proportion of the branched alkylene groups of the polyoxyalkylene diol, the hydroxy value, etc. mean average values.

It is preferred that the polyoxyalkylene diol (Y) has at least 2 alkylene groups, and at least half of the total number of the alkylene groups are branched alkylene groups. Particularly, it is preferred that from 75 to 100% of the total number of the alkylene groups are branched alkylene groups.

The average number of oxyalkylene groups per molecule of the polyoxyalkylene diol (Y) is from 2 to 10, more preferably form 2 to 7, particularly preferably from 2 to 5, in view of excellent migration property to the coated film surface.

The polyoxyalkylene diol (Y) is preferably a polypropylene glycol having from 2 to 6 oxypropylene groups, more preferably a polypropylene glycol having from 2 to 4 oxypropylene groups. The polypropylene glycol may, for example, be specifically dipropylene glycol, tripropylene glycol or tetrapropylene glycol.

The polypropylene glycol is usually obtained by reacting water with propylene oxide. By this reaction, the above polypropylene glycol forms together with propylene glycol, and the products are separated as the case requires. The polyoxyalkylene diol (Y) may be a mixture of polypropylene glycol differing in the degree of oligomerization, or may be a mixture of at least one polypropylene glycol and propylene glycol.

The aliphatic diisocyanate is a compound having a branched or straight chain alkylene group between two isocyanate groups. The alkylene group preferably has from 4 to 10 carbon atoms. As the material of the urethane polyol (X), preferred is an aliphatic diisocyanate having a branched alkylene group, whereby a high coated film hardness is obtained when the urethane polyol migrates to the coated film surface. Further, as the material of the urethane polyol (X), two or more types of aliphatic diisocyanates may be used.

The aliphatic diisocyanate having a branched alkylene group may, for example, be 2-methylpentane-1,5-diisocyanate, pentane-1,4-diisocyanate, hexane-1,5-diisocyanate or trimethylhexane-1,6-diisocyanate. The aliphatic diisocyanate having a straight chain alkylene group may, for example, be hexamethylene diisocyanate or tetramethylene diisocyanate.

The urethane polyol (X) is a reaction product obtained by reacting the polyoxyalkylene diol (Y) and the aliphatic diisocyanate under such conditions that the proportion of the number of isocyanate groups is less than 1 based on the hydroxy groups. A value of 100 times the proportion of the number of isocyanate groups based on hydroxy groups is called an isocyanate index. Accordingly, the urethane polyol (X) is a reaction product obtained by reacting the polyoxyalkylene diol (Y) and the aliphatic diisocyanate under conditions that the isocyanate index is less than 100.

Usually, when the reaction is carried out under conditions that the isocyanate index is closer to 100, the obtained reaction product tends to be a higher molecular weight urethane polyol, and on the contrary, when the reaction is carried out under conditions that the isocyanate index is more apart from 100, the obtained reaction product tends to be a lower molecular weight urethane polyol. Accordingly, by controlling the isocyanate index, the average molecular weight of the obtainable urethane polyol can be adjusted. Further, since the urethane polyol (X) is a reaction product of the polyoxyalkylene diol (Y) and the aliphatic isocyanate, the urethane polyol (X) is a urethane polyol having 2 hydroxy groups.

The number of the aliphatic diisocyanate residues in the urethane polyol (X) is preferably from 5 to 15, and is more preferably from 6 to 14, whereby the resulting coated film is excellent in the smoothness and the coated film is less likely to repel, and is particularly preferably from 7 to 13. In such a case, the number of the residues of the polyoxyalkylene diol (Y) is usually the number of the aliphatic diisocyanate residues plus 1.

The number average molecular weight of the urethane polyol (X) is preferably from 1,000 to 30,000, more preferably from 2,000 to 20,000. When the number average molecular weight of the urethane polyol (X) is at least 1,000, the coated film will not be sticky when the urethane polyol (X) migrates to the coated film surface. When the number average molecular weight of the urethane polyol (X) is at most 30,000, the urethane polyol (X) is likely to migrate to the coated film surface, and the coated surface will be excellent in the impact resistance.

The number average molecular weight of the urethane polyol (X) is obtained by calculation from the structure of the urethane polyol (X) specified by NMR analysis.

The hydroxy value of the urethane polyol (X) is preferably from 50 to 500 mgKOH/g, more preferably from 100 to 400 mgKOH/g. When the hydroxy value of the urethane polyol (X) is at least 50 mgKOH/g, the coated film surface tends to be hydrophilic. When the hydroxy value of the urethane polyol (X) is at most 500 mgKOH/g, the urethane polyol (X) itself is less likely to run off by heavy rain by typhoon or the like, and hydrophilicity of the coated film tends to be maintained over a long period of time.

The hydroxy value of the urethane polyol (X) may be measured by a method in accordance with JIS K1557-1 (2007).

(Other Components)

The urethane polyol (X) is usually used in a state of a solution in which the urethane polyol (X) is dissolved in an aqueous medium or a dispersion in which the urethane polyol (X) is dispersed in an aqueous medium.

The solution or dispersion may contain other components other than the urethane polyol (X) and the aqueous medium within a range not to impair the effects of the present invention.

Since the solution or dispersion is blended in the aqueous coating composition, the content of an organic solvent in the solution or dispersion is preferably at most 3 mass %, particularly preferably at most 1 mass %.

(Content of Urethane Polyol (X))

The content of the urethane polyol (X) is preferably from 0.5 to 30 parts by mass, more preferably from 5 to 20 parts by mass per 100 parts by mass of the solid content in the aqueous synthetic resin dispersion. When the content of the urethane polyol (X) is at least 5 parts by mass, the effects by the urethane polyol (X) will sufficiently be obtained. When the amount of the urethane polyol (X) is at most 20 parts by mass, the water resistance of the coated film can be secured.

(Aqueous Synthetic Resin Dispersion)

The aqueous synthetic resin dispersion may, for example, be a known aqueous acrylic resin dispersion, aqueous acrylic silicon resin dispersion or aqueous fluorinated resin dispersion. The aqueous synthetic resin dispersion may be in a two-pack type to be used with a curing agent in combination.

The aqueous synthetic resin dispersion is preferably an aqueous fluorinated resin dispersion, whereby the effects of the present invention will sufficiently be obtained.

(Aqueous Fluorinated Resin Dispersion)

The aqueous fluorinated resin dispersion is one having a fluorinated polymer dispersed or dissolved in an aqueous medium.

The fluorinated copolymer may be a polymer having structural units based on a fluorinated monomer or a polymer having structural units based on a fluorinated monomer and structural units based on another monomer copolymerizable with the fluorinated monomer.

The fluorinated monomer may, for example, be a fluoroolefin (such as vinylidene fluoride, trifluoroethylene, chlorotrifluoroethylene, tetrafluoroethylene, pentafluoroethylene or hexafluoropropylene), or a fluorinated (meth)acrylate (such as trifluoroethyl (meth)acrylate, pentafluoropropyl (meth)acrylate or perfluorocyclohexyl (meth)acrylate).

Among them, the fluorinated monomer is preferably a fluoroolefin, and among fluoroolefins, vinylidene fluoride, tetrafluoroethylene, hexafluoropropylene or chlorotrifluoroethylene is more preferred.

Such another monomer copolymerizable with the fluorinated monomer may, for example, be an acrylic monomer or another monomer copolymerized with an acrylic monomer.

The aqueous fluorinated resin dispersion is preferably the after-mentioned aqueous fluorinated resin dispersion (A1), aqueous fluorinated resin dispersion (A2) or aqueous fluorinated resin dispersion (A3), and is more preferably the aqueous fluorinated resin dispersion (A1) or the aqueous fluorinated resin dispersion (A2), whereby the resulting coated film is less likely to have cracks and will be excellent in the resistance to fungi and the resistance to algae.

The method for producing the aqueous fluorinated resin dispersion may, for example, be a method of obtaining the aqueous fluorinated resin dispersion by emulsion polymerization, or a method of obtaining a fluorinated copolymer by solution polymerization and dispersing the fluorinated copolymer in an aqueous medium to obtain the aqueous fluorinated resin dispersion.

The emulsion polymerization may be carried out by polymerization in batch process, polymerization by dropping a monomer, or polymerization by dropping an emulsified monomer.

The emulsifier to be used in the emulsion polymerization may, for example, be an anionic emulsifier, a cationic emulsifier, a nonionic emulsifier, an amphoteric emulsifier, a nonionic/cationic emulsifier or a nonionic/anionic emulsifier. For the purpose of improving the water resistance, an emulsifier having a reactive group may be used. The emulsifier may be used alone or in combination of two or more.

The polymerization initiator to be used for emulsion polymerization may be a known radical initiator, specifically, a persulfate (such as ammonium persulfate), a redox initiator (such as a combination of hydrogen peroxide and sodium bisulfite), a mixture of such an initiator with an inorganic initiator (such as ferrous ion or silver nitrate), a dibasic acid peroxide (such as disuccinic acid peroxide or diglutaric acid peroxide) or an organic initiator (such as azobisisobutyronitrile).

The amount of the polymerization initiator may, for example, be from about 0.01 to 5 parts by mass per 100 parts by mass of the monomer.

At the time of emulsion polymerization, to adjust the pH of the emulsified product, an inorganic salt (such as sodium carbonate, potassium carbonate or sodium thiosulfate) or an organic base (such as triethylamine or triethanolamine) may be added.

In a case where the fluorinated copolymer obtained by solution polymerization is used as dispersed in water, the remaining organic solvent may be distilled off. In order to increase the water dispersibility, hydrophilic groups may be introduced to the fluorinated copolymer obtained by solution polymerization, or an emulsifier may be used at the time of solution polymerization.

(Aqueous Fluorinated Resin Dispersion (A1))

The aqueous fluorinated resin dispersion (A1) is one in which a synthetic resin containing the fluorinated copolymer (A1p) is dispersed or dissolved in an aqueous medium.

The fluorinated copolymer (A1p) has structural units based on a monomer (m1), structural units based on a monomer (m2) and structural units based on a monomer (m3).

Monomer (m1)

The monomer (m1) is a fluoroolefin.

The fluoroolefin may, for example, be vinylidene fluoride, trifluoroethylene, chlorotrifluoroethylene, tetrafluoroethylene, pentafluoropropylene or hexafluoropropylene.

The fluoroolefin is preferably a $C_{2-4}$ fluoroolefin, particularly preferably a perhaloolefin.

Monomer (m2):

The monomer (m2) is a macromonomer having a hydrophilic moiety.

The monomer (m2) may be a compound having at least two structural units in its main chain, having a radical polymerizable unsaturated group at one terminal, and having a pendant group at the other terminal or a hydrophilic moiety in its main chain. The number of the structural units varies depending upon the type of the structural units and is usually preferably at most 100 in view of the polymerizability, the water resistance, etc.

It is important for the aqueous fluorinated resin dispersion (A1) that the fluorinated copolymer (A1p) has structural units based on the monomer (m2). By the aqueous fluorinated resin dispersion (A1) containing the fluorinated copolymer (A1p) having structural units based on the monomer (m2), not only mechanical and chemical stability of the aqueous fluorinated resin dispersion (A1) are improved but also the film forming property of the aqueous fluorinated resin dispersion (A1), the water resistance of a coated film, etc. will be improved.

The hydrophilic group constituting the hydrophilic moiety may be any of ionic, nonionic, amphoteric groups and a combination thereof. In view of the chemical stability of the aqueous fluorinated resin dispersion (A1), the hydrophilic moiety is preferably a combination of a moiety having an ionic hydrophilic group and a moiety having a nonionic or amphoteric hydrophilic group, or a combination of a moiety having an ionic hydrophilic group and a moiety having a hydrophilic bond, rather than only a moiety having an ionic hydrophilic group.

The monomer (m2) may, for example, be the following macromonomer.

Monomer (m21): A macromonomer having a polyoxyalkylene chain or a polyester chain in its main chain and a radical polymerizable unsaturated group at one terminal.

Monomer (m22): A macromonomer having a chain formed by radical polymerization of a hydrophilic ethylenic unsaturated monomer, and a radical polymerizable unsaturated group (a vinyloxy group or an allyloxy group) at one terminal.

The polyoxyalkylene chain or the polyester chain in the monomer (m21) is a moiety having a nonionic hydrophilic group.

The hydrophilic polyoxyalkylene chain is a polyoxyethylene chain. A polyoxyalkylene chain other than the polyoxyethylene chain is hydrophobic. An oxyalkylene group other than the oxyethylene group may be present in the polyoxyethylene chain, however, the oxyalkylene group other than the oxyethylene group is hydrophobic, and if its proportion is high, hydrophilicity of the polyoxyethylene chain will be lowered. The hydrophilic polyoxyalkylene chain is preferably one having a proportion of the number of oxyethylene groups based on the total number of all the oxyalkylene groups of preferably from 70 to 100%, more preferably from 90 to 100%.

The oxyalkylene group other than the oxyethylene group may, for example, be an oxypropylene group or an oxybutylene group. In a case where in the hydrophilic polyoxyalkylene chain, an oxyalkylene group other than the oxyethylene group is present, such an oxyalkylene group is preferably an oxypropylene group.

The monomer (m21) may, for example, be the following compounds.

(1) $CH_2=CHO—C_aH_{2a}—(OCH_2CH_2)_kOX^1$ wherein a is an integer of from 1 to 10, k is an integer of from 2 to 20, and $X^1$ is a hydrogen atom or a $C_{1-10}$ alkyl group (hereinafter referred to as a lower alkyl group).

(2) $CH_2=CHCH_2O—C_bH_{2b}—(OCH_2CH_2)_kOX^1$ wherein b is an integer of from 1 to 10, k 2 an integer of from 2 to 20, and $X^1$ is a hydrogen atom or a lower alkyl group.

(3) $CH_2=CHO—C_cH_{2c}—O(CO—C_dH_{2d}—O)_eH$ wherein c is an integer of from 1 to 10, d is an integer of from 1 to 10, and e is an integer of from 1 to 30.

(4) $CH_2=CHOCH_2\text{-cyclo}C_6H_{10}—CH_2(OCH_2CH_2)_kOX^1$ wherein $cycloC_6H_{10}$ is a cyclohexylene group, k is an integer of from 2 to 20, and $X^1$ is a hydrogen atom or a lower alkyl group.

Further, the polyoxyethylene chain represented by $(OCH_2CH_2)_k$ in the above formulae may have a small number of an oxyalkylene group other than the oxyethylene group as mentioned above. In such a case, such a monomer has a structure such that some of k oxyethylene groups $(OCH_2CH_2)_k$ is replaced with an oxyalkylene group other than the oxyethylene group.

The monomer (m21) is preferably one having a vinyl ether type structure at one terminal in view of excellent copolymerizability with the monomer (m1), and is particularly preferably one having a polyoxyalkylene chain moiety consisting solely of oxyethylene groups in view of excellent hydrophilicity.

The monomer (m21) is preferably one having at least two oxyethylene groups, whereby various properties such as stability are sufficiently obtained. If the number of oxyethylene groups is too large, the water resistance, the weather resistance and the like of a coated film may be decreased.

The monomer (m21) may be produced, for example, by a method of subjecting an alkylene oxide to ring opening addition to a vinyl ether or an allyl ether having a hydroxy group.

The monomer (m22) may, for example, be produced by the following method.

A method of radical-polymerizing an ethylenic unsaturated monomer having a hydrophilic group in the presence of an initiator having a functional group capable of condensation and a chain transfer agent, to prepare a polymer having functional groups capable of condensation, reacting e.g. glycidyl vinyl ether or glycidyl allyl ether to the functional groups capable of condensation to introduce a radical polymerizable unsaturated group to its terminal (Yamashita et. al, Polym. Bull., 5. 335 (1981)). The functional group capable of condensation may, for example, be a carboxy group, a hydroxy group or an amino group.

The ethylenic unsaturated monomer having a hydrophilic group may, for example, be acrylamide, methacrylamide, N-methylolacrylamide, N-methylmethacrylamide, 2-methoxyethyl acrylate, 2-methoxyethyl methacrylate, diacetoneacrylamide, hydroxyethyl acrylate, hydroxypropyl acrylate, hydroxybutyl acrylate, hydroxyethyl methacrylate, hydroxypropyl methacrylate, hydroxybutyl methacrylate, an acrylate of a polyhydric alcohol, a methacrylate of a polyhydric alcohol or vinylpyrrolidone.

The initiator having a functional group capable of condensation may, for example, be 4,4'-azobis-4-cyanovalerianic acid, 2,2'-azobis-2-amidinopropane hydrochloride, potassium persulfate, ammonium persulfate, azobisisobutyronitrile or benzoyl peroxide.

Monomer (m3):

Monomer (m3) is a hydroxy group-containing monomer represented by the following formula (m3):

$$R^1-R^2-OH \quad (m3)$$

wherein $R^1$ is a group having a radical polymerizable unsaturated group, $R^2$ is a n-nonylene group or a cyclohexane-1,4-dimethylene group.

It is important for the aqueous fluorinated resin dispersion (A1) that the fluorinated copolymer (A1p) has structural units based on the monomer (m3). If the fluorinated copolymer (A1p) has structural units based on a hydroxy group-containing monomer other than the monomer (m3), the fluorinated copolymer (A1p) may be agglomerated at the time of production, storage or formation into a coating material of the fluorinated copolymer (A1p).

$R^1$ has a radical polymerizable unsaturated group, and as the case requires, a linking group linking the radical polymerizable unsaturated group and $R^2$. The radical polymerizable unsaturated group may, for example, be a vinyl group, an allyl group, a propenyl group, an isopropenyl group, an acryloyl group or a methacryloyl group. The linking group is preferably an ether bond.

The monomer (m3) may, for example, be the following compounds.

(1) $CH_2=CHOCH_2\text{-cyclo}C_6H_{10}-CH_2OH$
(2) $CH_2=CHCH_2OCH_2\text{-cyclo}C_6H_{10}-CH_2OH$
(3) $CH_2=CHOC_9H_{18}OH$
(4) $CH_2=CHCH_2OC_9H_{18}OH$ The monomer (m3) is preferably one having a vinyl ether type structure, whereby such a monomer is excellent in alternating copolymerizability with the monomer (m1), and the weather resistance of a coated film will be favorable.

Monomer (m4):

The fluorinated copolymer (A1p) may have structural units based on another monomer copolymerizable with the monomers (m1) to (m3) (monomer (m4)) in addition to the structural units based on the monomers (m1) to (m3).

The monomer (m4) may, for example, be an olefin (such as ethylene or propylene), a vinyl ether (such as ethyl vinyl ether, propyl vinyl ether, butyl vinyl ether, cyclohexyl vinyl ether or 2-ethylhexyl vinyl ether), a vinyl ester (such as vinyl butanoate or vinyl octoate), an aromatic vinyl compound (such as styrene or vinyltoluene), an allyl compound (such as ethyl allyl ether), an acryloyl compound (such as butyl acrylate) or a methacryloyl compound (such as ethyl methacrylate).

The monomer (m4) is preferably an olefin, a vinyl ether, a vinyl ester, an allyl ether or an allyl ester.

The olefin is preferably a $C_{2-10}$ olefin.

The vinyl ether, the vinyl ester, the allyl ether and the allyl ester are preferably ones having a $C_{2-15}$ straight chain, branched or alicyclic alkyl group.

The monomer (m4) may be one having at least some of hydrogen atoms bonded to a carbon atom substituted with fluorine atoms.

Proportion of Structural Units

The proportion of the structural units based on the monomer (m1) is preferably from 20 to 80 mol %, more preferably from 30 to 70 mol % based on all the structural units. When the proportion of the structural units based on the monomer (m1) is at least 20 mol %, sufficient weather resistance will be obtained. When the proportion of the structural units based on the monomer (m1) is at most 80 mol %, the water dispersibility of the fluorinated copolymer (A1p) will be favorable.

The proportion of the structural units based on the monomer (m2) is preferably from 0.1 to 25 mol %, more preferably from 0.3 to 20 mol % based on all the structural units. When the proportion of the structural units based on the monomer (m2) is at least 0.1 mol %, the water dispersibility of the fluorinated copolymer (A1p) will be favorable. When the proportion of the structural units based on the monomer (m2) is at most 25 mol %, the weather resistance and the moisture resistance of a coated film will be favorable. When the proportion of the structural units based on the monomer (m2) is within the above range, very excellent film forming property will be obtained.

The proportion of the structural units based on the monomer (m3) is preferably from 1 to 40 mol % based on all the structural units.

The proportion of the structural units based on the monomer (m3) is preferably such that the hydroxy value of the fluorinated copolymer (A1p) is at least 20 mgKOH/g, more preferably at least 40 mgKOH/g. When the hydroxy value of the fluorinated copolymer (A1p) is at least 20 mgKOH/g, due to the reactivity with a curing agent, the solvent resistance and the like of a coated film will remarkably improve.

Production of Aqueous Fluorinated Resin Dispersion (A1)

The aqueous fluorinated resin dispersion (A1) is produced by emulsion polymerization.

Even though an aqueous fluorinated resin dispersion (A1) having favorable dispersion stability can be obtained without using an emulsifier, an emulsifier is preferably used. As a nonionic emulsifier, an alkylphenol ethylene oxide adduct, a higher alcohol ethylene oxide adduct, or a block copolymer of ethylene oxide and propylene oxide may, for example, be mentioned. As an anionic emulsifier, an alkylbenzene sulfonate, an alkylnaphthalene sulfonate, a higher fatty acid salt, an alkylsulfuric acid ester salt, an alkyl ether sulfuric acid ester salt or a phosphoric acid ester salt may, for example, be mentioned.

Emulsion polymerization is initiated by addition of a polymerization initiator in the same manner as initiation of conventional emulsion polymerization.

The polymerization initiator may be a known radical initiator, and is preferably a water-soluble initiator. It may, for example, be specifically a persulfate (such as ammonium persulfate), a redox initiator (such as a combination of hydrogen peroxide and a reducing agent (such as sodium hydrogen sulfite or sodium thiosulfate)), a system in which an inorganic initiator (such as iron, ferrous salt or silver sulfate) coexist with the above initiator, a dibasic acid peroxide (such as disuccinic acid peroxide or diglutaric acid peroxide) or an organic initiator (such as azobisisobutylamidine hydrochloride or azobisisobutyronitrile).

The amount of the polymerization initiator may properly be set depending upon its type, the emulsion polymerization conditions, etc., and is usually from about 0.005 to about 0.5 part by mass per 100 parts by mass of the monomers.

The polymerization initiator may be added all at once or may be added dividedly.

For the purpose of increasing the pH of the emulsified product, a pH adjusting agent may be used. The pH adjusting agent may, for example, be an inorganic base (such as sodium carbonate, potassium carbonate, sodium hydrogen orthophosphate, sodium thiosulfate or sodium tetraborate) or an organic base (such as triethylamine, triethanolamine, dimethylethanolamine or diethylethanolamine).

The amount of the pH adjusting agent is usually from about 0.05 to about 2 parts by mass, preferably from 0.1 to 2 parts by mass per 100 parts by mass of the aqueous medium to be used for emulsion polymerization. The higher the pH of the emulsified product, the higher the polymerization rate tends to be.

The emulsion polymerization initiation temperature is properly set depending upon the type of the polymerization initiator and is usually from about 0 to about 100° C., preferably from 10 to 90° C.

The pressure at the time of emulsion polymerization may properly be set, and is usually from about 0.1 to about 10 MPa, preferably from 0.2 to 5 MPa.

At the time of emulsion polymerization, the monomers, the aqueous medium, the emulsifier, the polymerization initiator and the like may be charged all at once to conduct polymerization, or for the purpose of reducing the particle size of the fluorinated copolymer (A1p) thereby to improve various physical properties such as the stability of the aqueous fluorinated resin dispersion (A1) and the gloss of a coated film, the monomers may be pre-emulsified by a stirring machine such as a homogenizer prior to addition of the polymerization initiator and then the polymerization initiator is added to conduct polymerization. The monomers may be dividedly added or may be continuously added. In a case where they are added dividedly or continuously, the monomer composition may be changed.

Another Synthetic Resin

The aqueous fluorinated resin dispersion (A1) may contain a synthetic resin other than the fluorinated copolymer (A1p) within a range not to impair the effects of the present invention. Such another synthetic resin may, for example, be a fluorinated resin, a phenol resin, an alkyd resin, a melamine resin, a urea resin, a vinyl resin, an epoxy resin, polyester, polyurethane or an acrylic resin.

The proportion of the fluorinated copolymer (A1p) is preferably at least 50 mass %, more preferably 100 mass % based on all the synthetic resins contained in the aqueous fluorinated resin dispersion (A1).

The solid content concentration of the synthetic resin is preferably from 10 to 100 mass %, more preferably from 30 to 80 mass % in the aqueous fluorinated resin dispersion (A1).

Other Components

The aqueous fluorinated resin dispersion (A1) may contain components other than the fluorinated copolymer (A1p), another synthetic resin and the aqueous medium within a range not to impair the effects of the present invention.

Such other components may be ones mentioned hereinafter.

Since the aqueous fluorinated resin dispersion (A1) is blended in the aqueous coating composition, the content of an organic solvent in the aqueous fluorinated resin dispersion (A1) is preferably at most 3 mass %, particularly preferably at most 1 mass %.

(Aqueous Fluorinated Resin Dispersion (A2))

The aqueous fluorinated resin dispersion (A2) is one in which a synthetic resin containing the fluorinated copolymer (A2p) is dispersed or dissolved in an aqueous medium (preferably water).

The fluorinated copolymer (A2p) has structural units (a1), structural units (a2), structural units (a3) and structural units (a4).

The aqueous fluorinated resin dispersion (A2) is preferably one obtained by introducing a carboxy group to a fluorinated copolymer (B) obtained by a solution polymerization method and neutralizing the carboxy group with a basic compound, and dispersing the fluorinated copolymer (B) in water, as described hereinafter.

Structural Units (a1)

Structural units (a1) are structural units based on a fluoroolefin compound represented by the following formula (a1):

wherein each of $X^1$ and $X^2$ which are independent of each other, is a hydrogen atom, a chlorine atom or a fluorine atom, $X^3$ is a hydrogen atom, a chlorine atom, a fluorine atom or —$CY^1Y^2Y^3$, and each of $Y^1$, $Y^2$ and $Y^3$ which are independent of one another, is a hydrogen atom, a chlorine atom or a fluorine atom.

The fluoroolefin compound may be a fluoroethylene or a fluoropropene.

The fluoroethylene may, for example, be $CF_2$=$CF_2$, $CClF$=$CF_2$, $CHCl$=$CF_2$, $CCl_2$=$CF_2$, $CClF$=$CClF$, $CHF$=$CCl_2$, $CH_2$=$CClF$, $CCl_2$=$CClF$ or $CF_2$=$CH_2$.

The fluoropropene may, for example, be $CF_2ClCF$=$CF_2$, $CF_3CCl$=$CF_2$, $CF_3CF$=$CFCl$, $CF_2ClCCl$=$CF_2$, $CF_2ClCF$=$CFCl$, $CFCl_2CF$=$CF_2$, $CF_3CCl$=$CClF$, $CF_3CCl$=$CCl_2$, $CClF_2CF$=$CCl_2$, $CCl_3CF$=$CF_2$, $CF_2ClCCl$=$CCl_2$, $CFCl_2CCl$=$CCl_2$, $CF_3CF$=$CHCl$ or $CClF_2CF$=$CHCl$.

The fluoroolefin compound is preferably $CF_2$=$CF_2$ or $CClF$=$CF_2$ in view of excellent weather resistance of a coated film.

Structural Units (a2)

The structural units (a2) are structural units based on an alkyl vinyl ether, an alkyl vinyl ester, an alkyl allyl ether, an alkyl allyl ester or the like represented by the following formula (a2). Among them, structural units are properly selected depending upon desired physical properties (such as hardness, gloss or pigment dispersibility) of a coated film. The fluorinated copolymer (A2') may have two or more types of the structural units (a2):

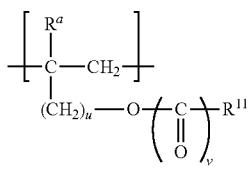

(a2)

wherein $R^a$ is a hydrogen atom or a methyl group, $R^{11}$ is a $C_{1-12}$ alkyl group or a $C_{4-10}$ monovalent alicyclic group, u is an integer of from 0 to 8, and v is 0 or 1.

The structural units (a2) are preferably structural units based on an alkyl vinyl ether or an alkyl vinyl ester wherein u is 0 and v is 1. The alkyl vinyl ether or the alkyl vinyl ester may, for example, be ethyl vinyl ether, n-butyl vinyl ether, cyclohexyl vinyl ether, vinyl acetate, vinyl valerate or vinyl pivalate.

The structural units (a2) are preferably structural units based on ethyl vinyl ether or cyclohexyl vinyl ether, whereby such structural units have favorable alternating copolymerizability with the structural units (a1), and the glass transition temperature of the fluorinated copolymer (A2p) is easily adjusted.

Structural Units (a3)

The structural units (a3) are structural units based on a hydroxy group-containing vinyl ether, a hydroxy group-containing vinyl ester, a hydroxy group-containing allyl ether or a hydroxy group-containing allyl ester, represented by the following formula (a3):

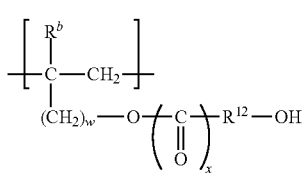

(a3)

wherein $R^b$ is a hydrogen atom or a methyl group, $R^{12}$ is a $C_{1-10}$ alkylene group or a $C_{4-10}$ bivalent alicyclic group, w is an integer of from 0 to 8, and x is 0 or 1.

The structural units (a3) may be structural units based on 2-hydroxyalkyl vinyl ether, 4-hydroxybutyl vinyl ether, 1-hydroxymethyl-4-vinykmmethylcyclohexane or 4-hydroxypropyl vinyl ester.

The structural units (a3) are preferably structural units based on a hydroxyalkyl vinyl ether in view of the polymerizability, the crosslinking property, etc.

Structural Units (a4)

The structural units (a4) are structural units represented by the following formula (a4):

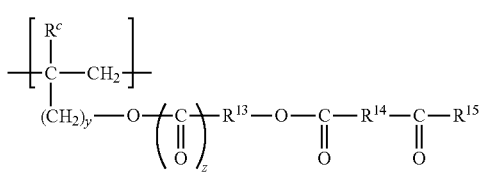

(a4)

wherein $R^c$ is a hydrogen atom or a methyl group, $R^{13}$ is a $C_{1-10}$ alkylene group or a $C_{4-10}$ bivalent alicyclic group, $R^{14}$ is a $C_{2-10}$ alkylene group or a $C_{4-10}$ bivalent alicyclic group, $R^{15}$ is —OH or —O$^{-+}$NHZ$^1$ Z$^2$Z$^3$, each of Z$^1$, Z$^2$ and Z$^3$ which are independent of one another, is a hydrogen atom, a $C_{1-4}$ alkyl group or a $C_{1-6}$ hydroxyalkyl group, at least some of $R^{15}$ are —O$^{-+}$NHZ$^1$Z$^2$Z$^3$, y is an integer of from 0 to 8, and z is 0 or 1.

The proportion of $R^{15}$ being —O$^{31}$ $^+$NHZ$^1$Z$^2$Z$^3$ is preferably from 30 to 100 mol %, more preferably from 50 to 100 mol %.

$R^c$, $R^{13}$, y and z are preferably the same as $R^b$, $R^{12}$, w and x in the structural units (a3) in view of easy production of the fluorinated copolymer (A2').

Other Structural Units

The fluorinated copolymer (A2p) may have structural units other than the structural units (a1) to (a4).

Such other structural units may be structural units based on an ethylenic monomer.

Proportion of Structural Units

The proportion of the structural units (a1) is from 40 to 60 mol %, preferably from 45 to 55 mol % based on all the structural units. When the proportion of the structural units (a1) is within the above range, the weather resistance of a coated film will be sufficient, the glass transition temperature of the fluorinated copolymer (A2p) will not be too high, and a favorable amorphous coated film will be obtained.

The proportion of the structural units (a2) is from 3 to 50 mol %, preferably from 20 to 45 mol % based on all the structural units. When the proportion of the structural units (a2) is within the above range, the resulting fluorinated copolymer is easily dispersed in water and hardly settles during storage.

The proportion of the structural units (a3) is from 4 to 30 mol %, preferably from 8 to 25 mol % based on all the structural units. When the proportion of the structural units (a3) is at least 4 mol %, the resulting fluorinated copolymer has sufficiently high crosslink density when crosslinked. When the proportion of the structural units (a3) is at most 30 mol %, a decrease in the water resistance when formed into a coated film will be suppressed.

The proportion of the structural units (a4) is from 0.4 to 7 mol %, preferably from 1.4 to 6 mol % based on all the structural units. When the proportion of the structural units (a4) is within the above range, the resulting copolymer is excellent in dispersibility in an aqueous medium and is excellent in the stability in the aqueous medium.

The total amount of the structural units (a1) to (a4) is from 80 to 100 mol %, preferably from 95 to 100 mol %.

The proportion of other structural units is preferably at most 20 mol %, preferably at most 5 mol %.

The fluorinated copolymer (A2p) is preferably one comprising from 45 to 55 mol % of the structural units (a1), from 14 to 45.6 mol % of the structural units (a2), from 8 to 25 mol % of the structural units (a3) and from 1.4 to 6 mol % of the structural units (a4) and containing no other structural units.

Production of Aqueous Fluorinated Resin Dispersion (A2)

The aqueous fluorinated resin dispersion (A2) may be produced by a process comprising the steps (α) to (δ).

(α) A step of producing a fluorinated copolymer (B).

(β) A step of reacting the fluorinated copolymer (B) and a dibasic acid anhydride in an organic solvent to esterify some of hydroxy groups in the structural units (a3) to introduce carboxy groups.

(γ) A step of neutralizing at least some of the carboxy groups introduced by the esterification reaction with a basic compound.

(δ) A step of removing the organic solvent.

Step (α):

The fluorinated copolymer (B) has from 40 to 60 mol % of the structural units (a1), from 3 to 50 mol % of the structural units (a2) and from 4.4 to 37 mol % of the structural units (a3) (provided that the total amount of the structural units (a1) to (a3) is from 80 to 100 mol %).

The mol % of the structural units (a3) in the fluorinated copolymer (B) is equal to the sum of mol % of the structural units (a3) and mol % of the structural units (a4) in the fluorinated copolymer (A2').

The fluorinated copolymer (B) may be produced by polymerizing a monomer (b1), a monomer (b2) and a monomer (b3) in the presence or absence of a polymerization catalyst by applying a polymerization initiation source such as a polymerization initiator or ionizing radiation under alkaline conditions. In order that the copolymerization reaction system is kept at an alkali side, the polymerization reaction is carried out in the presence of a basic compound.

The monomer (b1) is a compound represented by the following formula (b1):

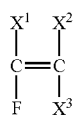

wherein each of $X^1$ and $X^2$ which are independent of each other, is a hydrogen atom, a chlorine atom or a fluorine atom, $X^3$ is a hydrogen atom, a chlorine atom, a fluorine atom or $-CY^1Y^2Y^3$, and each of $Y^1$, $Y^2$ and $Y^3$ which are independent of one another, is a hydrogen atom, a chlorine atom or a fluorine atom.

The monomer (b2) is a monomer represented by the following formula (b2):

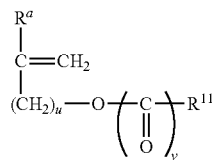

wherein $R^a$ is a hydrogen atom or a methyl group, $R^{11}$ is a $C_{1-12}$ alkyl group or a $C_{4-10}$ monovalent alicyclic group, u is an integer of from 0 to 8, and v is 0 or 1.

The monomer (b3) is a compound represented by the following formula (b3):

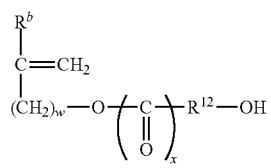

wherein $R^b$ is a hydrogen atom or a methyl group, $R^{12}$ is a $C_{1-10}$ alkylene group or a $C_{4-10}$ bivalent alicyclic group, w is an integer of from 0 to 8, and x is 0 or 1.

The charge ratio (mol %) of the monomer (b1), the monomer (b2) and the monomer (b3) is the same as the ratio of mol % of the structural units (a1), the structural units (a2) and the structural units (a3) constituting the fluorinated copolymer (B).

The polymerization initiator may, for example, be a peroxyester type peroxide (such as t-butyl peroxyacetate), a dialkyl peroxydicarbonate (such as diisopropyl peroxydicarbonate), benzoyl peroxide or azobisisobutylnitrile.

The amount of the polymerization initiator may properly be set depending upon its type, the polymerization reaction conditions, etc., and is usually from about 0.05 to about 0.5 part by mass per 100 parts by mass of the monomers.

The basic compound may be an organic basic compound or an inorganic basic compound. The organic basic compound may, for example, be an alkylamine (such as triethylamine) or an alkylphosphine (such as triethylphosphine). The inorganic basic compound may, for example, be a carbonate of an alkali metal or alkaline earth metal (such as potassium carbonate), a hydroxide of an alkali metal or alkaline earth metal (such as potassium hydroxide or sodium hydroxide) or an oxide of an alkali metal or alkaline earth metal (such as magnesium oxide).

The amount of the basic compound is preferably from 0.01 to 20 mass %, more preferably from 0.1 to 10 mass % per 100 parts by mass of the monomers.

The polymerization method is preferably a solution polymerization method. As an organic solvent, an alcohol, an ester, a ketone, a saturated halogenated hydrocarbon having at least one fluorine atom or an aromatic hydrocarbon (such as xylene) may, for example, be mentioned.

The temperature at the time of solution polymerization is preferably from 10 to 90° C.

The pressure at the time of solution polymerization is preferably from 0 to 2 MPa, more preferably from 0 to 1 MPa.

The mass average molecular weight of the fluorinated copolymer (B) is preferably from 3,000 to 200,000. When the mass average molecular weight of the fluorinated copolymer (B) is at least 3,000, the weather resistance when formed into a coated film will be favorable. When the mass average molecular weight of the fluorinated copolymer (B) is at most 200,000, favorable coating properties will be obtained, and the outer appearance of a coated film will be favorable.

Step (β):

By reacting the fluorinated copolymer (B) and a dibasic acid anhydride in an organic solvent, some of hydroxy groups in the structural units (a3) are esterified to introduce carboxy groups.

The dibasic acid anhydride may, for example, be succinic anhydride, glutaric anhydride, itaconic anhydride, adipic anhydride, 1,2-cyclohexanedicarboxylic anhydride, cis-4-cyclohexene-1,2-dicarboxylic anhydride, phthalic anhydride, 1,8-naphthalic anhydride or maleic anhydride.

The organic solvent may, for example, be an alcohol (such as methanol, ethanol, n-propanol, isopropanol, n-butanol, isobutanol, secondary butanol, tertiary butanol or pentanol), a cellosolve (such as methyl cellosolve, ethyl cellosolve, isopropyl cellosolve, butyl cellosolve or secondary butyl cellosolve), a propylene glycol derivative (such as propylene glycol methyl ether, dipropylene glycol methyl ether or propylene glycol methyl ether acetate), ethylene glycol ethyl ether acetate, a ketone (such as acetone, methyl ethyl ketone or methyl isobutyl ketone) or an aromatic hydrocarbon (such as toluene or xylene).

The organic solvent may be properly selected considering the solubility of the fluorinated polymer (B) and the dibasic acid anhydride, etc. Here, addition of a new organic solvent is not necessarily required in the step (β) when the organic solvent used in the step (α) sufficiently remains.

In the step (β), a catalyst may be used in combination. The catalyst may, for example, be a metal carboxylate, an alkali hydroxide, an alkali metal carbonate, a quaternary ammonium salt or a tertiary amine, and is preferably a tertiary amine (such as triethylamine).

The esterification reaction temperature is preferably from room temperature to 150° C., more preferably from 50 to 100° C. The esterification reaction time is from about several tens minutes to about several hours.

The amount of the dibasic acid anhydride is adjusted and determined so that the proportion of the structural units (a4) is from 0.4 to 7 mol % and the proportion of the structural units (a3) is from 4 to 30 mol % in the resulting fluorinated copolymer (A2p).

The proportion of the structural units (a4) after the esterification reaction may be confirmed by measuring the acid value. The proportion of the structural units (a4) of from 0.4 to 7 mol % can be confirmed by the acid value after the esterification reaction of from 2 to 35 mgKOH/g.

The proportion of the structural units (a3) before the esterification reaction may be confirmed from the hydroxy value before the esterification reaction. In order that the proportion of the structural units (a3) is from 4 to 30 mol %, it is necessary that the hydroxy value before the esterification reaction is from 20 to 150 mgKOH/g, and the acid value after the esterification reaction is within the above range.

Step (γ)

To the polymer obtained by the reaction of the fluorinated copolymer (B) and the dibasic acid anhydride obtained in the step (β), a basic compound is added to neutralize at least some of the carboxy groups introduced in the step (β) with the basic compound.

The proportion of the structural units (a4) being neutralized with the basic compound is preferably from 30 to 100 mol %, more preferably from 50 to 100 mol %.

The neutralization reaction will sufficiently proceed by adding the basic compound or an aqueous solution of the basic compound to an organic solvent in which the fluorinated copolymer (B) obtained in the step (β) is dissolved with stirring at room temperature for several tens minutes.

The basic compound is preferably one having a boiling point of at most 200° C., whereby the basic compound hardly remains in a coated film.

The basic compound having a boiling point of at most 200° C. may, for example, be ammonia, an alkylamine (such as monomethylamine, dimethylamine, trimethylamine, monoethylamine, diethylamine, triethylamine, monoisopropylamine, diisopropylamine, triisopropylamine, monobutylamine or dibutylamine), an alkanolamine (such as monoethanolamine, monoisopropanolamine, dimethylaminoethanol or diethylaminoethanol), a diamine (such as ethylenediamine, propylenediamine, tetramethylenediamine or hexamethylenediamine), an alkyleneimine (such as ethyleneimine or propyleneimine), piperazine, morpholine, pyrazine or pyridine.

In the step (γ), to the organic solvent in which the polymer obtained by the reaction of the fluorinated copolymer (B) and the dibasic acid anhydride obtained in the step (β) is dissolved, water may be added together with the basic compound. Water may be added simultaneously with addition of the basic compound, or may be added separately from the basic compound, or a part thereof may be added simultaneously with addition of the basic compound and the rest is added separately from the basic compound. In a case where a part of or the entire water is added simultaneously with addition of the basic compound, it is added preferably in a form of an aqueous solution of the basic compound. In a case where it is added separately from the basic compound, water may be added before addition of the basic compound, or water may be added after the basic compound is added. It is particularly preferred to add water after the basic compound is added or to add an aqueous solution of the basic compound.

The amount of the water is preferably such that the solid content concentration of the aqueous dispersion obtained in the step (γ) is from 20 to 70 mass %, more preferably from 30 to 60 mass %.

Step (δ)

After the step (γ), the organic solvent is removed, whereby an aqueous fluorinated resin dispersion (A2) having a proportion of the organic solvent of at most 10 mass % based on the total mass is obtained. It is preferred that the entire organic solvent is removed.

The organic solvent to be removed may be the remaining organic solvent used in the step (α) and the remaining organic solvent used in the step (β).

Removal of the organic solvent may be carried out by distillation under reduced pressure.

In a case where water in a required amount is not added in the step (γ), water may be added after the organic solvent is removed.

The amount of water is preferably such that the solid content concentration of the aqueous dispersion obtained in the step (δ) is from 20 to 70 mass %, more preferably from 30 to 60 mass %.

Another Synthetic Resin

The aqueous fluorinated resin dispersion (A2) may contain a synthetic resin other than the fluorinated copolymer (A2p) within a range not to impair the effects of the present invention. Such another synthetic resin may, for example, be a fluorinated resin, a phenol resin, an alkyd resin, a melamine resin, a urea resin, a vinyl resin, an epoxy resin, polyester, polyurethane or an acrylic resin.

The fluorinated resin is preferably a fluorinated copolymer essentially containing structural units based on a fluoroolefin and structural units based on a macromonomer having a hydrophilic moiety, as disclosed in Japanese Patent No. 2955336, whereby the mechanical stability and the chemical stability of the aqueous fluorinated resin dispersion (A2) will be improved.

The proportion of the fluorinated copolymer (A2p) is preferably from 10 to 100 mass %, more preferably from 50 to 100 mass % based on all the synthetic resins contained in the aqueous fluorinated resin dispersion (A2).

In a case where as another synthetic resin, a synthetic resin other than the fluorinated resin is used, the proportion of the fluorinated copolymer (A2p) is preferably at least 55 mass % based on all the synthetic resins, with a view to imparting excellent weather resistance to a coated film.

The solid content concentration of the synthetic resin is preferably from 10 to 100 mass %, more preferably from 30 to 80 mass % in the aqueous fluorinated resin dispersion (A2).

Other Components

The aqueous fluorinated resin dispersion (A2) may contain components other than the fluorinated copolymer (A2p), another synthetic resin and the aqueous medium within a range not to impair the effects of the present invention. Such other components may be ones as described hereinafter.

The content of the organic solvent in the aqueous fluorinated resin dispersion (A2) is preferably at most 10 mass %, more preferably at most 3 mass %, particularly preferably 0 mass %.

The organic solvent may be the remaining organic solvent used in the step ($\alpha$) or the remaining organic solvent used in the step ($\beta$).

Since the aqueous fluorinated resin dispersion (A2) is blended in the aqueous coating composition, the content of the organic solvent in the aqueous fluorinated resin dispersion (A2) is preferably at most 3 mass %, particularly preferably at most 1 mass %.

(Aqueous Fluorinated Resin Dispersion (A3))

The aqueous fluorinated resin dispersion (A3) is one in which a synthetic resin including a fluorinated polymer (A3p) (excluding the fluorinated copolymer (A1p) and the fluorinated copolymer (A2p)) is dispersed or dissolved in an aqueous medium.

The fluorinated polymer (A3p) has structural units based on at least one fluorinated monomer selected from the group consisting of vinylidene fluoride, tetrafluoroethylene, hexafluoropropylene and chlorotrifluoroethylene.

The fluorinated polymer (A3p) may have structural units based on another monomer copolymerizable with the fluorinated monomer (such as an acrylic monomer, or another monomer copolymerizable with an acrylic monomer).

The aqueous fluorinated resin dispersion (A3) preferably contains an acrylic resin as a synthetic resin other than the fluorinated polymer (A3p) in view of the film forming property and the adhesion to a substrate of a coated film.

The acrylic resin preferably has structural units based on at least one acrylic monomer selected from the group consisting of acrylic acid, an acrylate, methacrylic acid and a methacrylate.

The acrylate is preferably an acrylic acid alkyl ester in which the alkyl group has from 1 to 10 carbon atoms, whereby a coated film excellent in the transparency and the film forming property is obtained.

The methacrylate is preferably a methacrylic acid alkyl ester in which the alkyl group has from 1 to 10 carbon atoms, whereby a coated film excellent in the transparency and the film forming property will be obtained.

The aqueous fluorinated resin dispersion (A3) containing the acrylic resin may be prepared by mixing a dispersion of the fluorinated polymer (A3p) and a dispersion of the acrylic resin.

The mass ratio of the fluorinated polymer (A3p) and the acrylic resin (fluorinated polymer (A3p)/acrylic resin) is preferably from 10/90 to 90/10, more preferably from 20/80 to 80/20. If the amount of the fluorinated polymer (A3p) is too large, the film forming property and the adhesion to a substrate of a coated film will be lowered. If the amount of the acrylic resin is too large, the weather resistance of a coated film will be lowered.

The aqueous fluorinated resin dispersion (A3) containing an acrylic resin may be "Kynar Aquatec FMA-12", tradename, manufactured by Arkema (vinylidene fluoride polymer/acrylic resin=50/50 (mass ratio), acrylic resin=methyl methacrylate units/ethyl methacrylate units/butyl methacrylate units=60/20/20 (mass ratio)).

(Curing Agent)

In a case where the aqueous fluorinated resin dispersion is the aqueous fluorinated dispersion (A1), the aqueous coating composition of the present invention may further contain a curing agent or may not contain a curing agent.

In a case where the aqueous fluorinated resin dispersion is the aqueous fluorinated resin dispersion (A2), the aqueous coating composition of the present invention preferably further contains a curing agent.

In a case where the aqueous fluorinated resin dispersion is the aqueous fluorinated resin dispersion (A3), the aqueous coating composition of the present invention may further contain a curing agent or may not contain a curing agent.

In a case where the aqueous coating composition of the present invention further contains a curing agent, the curing agent is preferably prepared as one liquid of the aftermentioned aqueous coating material kit, and the curing agent is mixed with the other liquid immediately before use to prepare the aqueous coating composition of the present invention.

In a case where the aqueous coating composition of the present invention further contain a curing agent, the mass ratio (aqueous synthetic resin dispersion/curing agent) of the aqueous synthetic resin dispersion to the curing agent based on the volatile content (solid component) is preferably from 50 to 95/5 to 50, more preferably from 65 to 90/10 to 35.

Depending upon the type of the curing agent, crosslinking may occur even by cold drying, and a coated film can be formed by mixing the aqueous synthetic resin dispersion with the curing agent and applying the mixture. In the case of a curing agent which should be heated for crosslinking, a coated film can be formed by baking.

The curing agent is preferably a water-soluble or water-dispersible curing agent having a functional group reactive with a hydroxy group or a carboxy group. It may, for example, be specifically an isocyanate compound, a melamine resin, a phenol resin, a xylene resin or a toluene resin, and is particularly preferably an isocyanate compound, whereby a coated film excellent in the weather resistance and mechanical properties will easily be obtained.

The isocyanate compound is preferably a polyisocyanate compound (C1) which can be mechanically dispersed in water or a self-emulsifiable polyisocyanate compound (C2).

(Polyisocyanate Compound (C1):

The polyisocyanate compound (C1) may, for example, be an aliphatic polyisocyanate (such as hexamethylene diisocyanate), an aromatic polyisocyanate (m- or p-phenylene diisocyanate, 2,4- or 2,6-tolylene diisocyanate, diphenylmethane-4,4'-diisocyanate, naphthalene-1,5-diisocyanate, 4,4'-diisocyanate-3,3'-dimethyldiphenyl), an alicyclic polyisocyanate (such as bis-(isocyanate cyclohexyl)methane or isophorone diisocyanate), a crude polyisocyanate (such as crude tolylene diisocyanate or crude diphenylmethane diisocyanate), a modified polyisocyanate (such as carbodiimide-modified diphenylmethane diisocyanate, polyol-modified diphenylmethane diisocyanate or polyol-modified hexamethylene diisocyanate).

The polyisocyanate compound (C1) may be a dimer or trimer depending on its type such as Burette type, an isocyanate ring type or an uretdione type, or it may be a blocked polyisocyanate obtained by reacting an isocyanate group with a block agent. The block agent may, for example, be an alcohol, a phenol, a phenol derivative, a caprolactam, an oxime or an active methylene compound.

With a blocked polyisocyanate, usually curing will not occur at 140° C. or higher, and accordingly when curing is desired to be carried out at a temperature lower than such a temperature, it is preferred to use a non-blocked polyisocyanate.

The polyisocyanate compound (C1) may be used alone or in combination of two or more.

The polyisocyanate compound (C1) is used as mechanically dispersed in water.

The polyisocyanate compound (C1) is preferably one having a relatively low viscosity since it is mechanically dispersed in water. When an emulsifier is added at the time of dispersing it, a more stable dispersion can be obtained. The emulsifier may be a known emulsifier, and is preferably one having no ionic group particularly active hydrogen atom, to prevent it from being reacted with the polyisocyanate compound (C1) thereby to increase the viscosity, or to prevent a decrease in the dispersibility of the polyisocyanate compound (C1). The emulsifier is preferably a nonionic emulsifier, particularly preferably an emulsifier having a polyoxyethylene chain.

Polyisocyanate Compound (C2)

The polyisocyanate compound (C2) is a self-emulsifiable polyisocyanate compound which can be emulsified and dispersed in water without an emulsifier. The self-emulsifiable polyisocyanate compound is disclosed e.g. in JP-B-4-15270.

The polyisocyanate compound (C2) may, for example, be a prepolymer obtained by reacting the polyisocyanate compound (C1) with a compound having a hydrophilic polyoxyalkylene chain. The compound having a polyoxyalkylene chain is preferably one having a number average molecular weight of from 200 to 4,000, having at least one group reactive with an isocyanate, more preferably a polyoxyalkylene polyol or polyoxyalkylene monool having a molecular weight of from 300 to 1,500. When the number average molecular weight is at least 200, self-emulsion property will sufficiently be obtained. When the number average molecular weight is at most 4,000, favorable stability in water will be obtained. Further, the crystallinity will not be too high, favorable storage stability at low temperature will be obtained, and turbidity will hardly occur.

The polyoxyalkylene chain is preferably one of which the entire or most of oxyalkylene groups are oxyethylene groups in view of hydrophilicity.

The reaction of the polyisocyanate compound (C1) with the compound having a polyoxyalkylene chain is carried out in the presence of a catalyst (such as a tertiary amine, an alkyl-substituted ethyleneimine, a tertiary alkylphosphine, a metal alkyl acetonate or an organic acid metal salt) and as the case requires, in the presence of a promoter at a temperature of at most 100° C. With respect to the reaction, it is preferred to adjust the amount of remaining isocyanate group to be from 10 to 24 mass %, more preferably from 15 to 20 mass %. When the amount of the remaining isocyanate group is at least 10 mass %, the reactivity with the fluorinated copolymer (A1p) or the fluorinated copolymer (A2p) will be favorable. Further, even with a small amount of the polyisocyanate compound (C2), a sufficient degree of cross-linking will be achieved, and accordingly a coated film will have favorable weather resistance. When the amount of the remaining isocyanate group is at most 24 mass %, a stable emulsified product will be obtained.

Other Curing Agent:

The melamine resin may be a melamine resin subjected to an alkyl etherification (such as methyl etherification, butyl etherification or isobutyl etherification), in view of water solubility, a melamine resin wherein at least a part of it is methyl-etherified, is preferred.

(Other Components)

The aqueous coating composition of the present invention may contain other components in addition to the aqueous synthetic resin dispersion, the urethane polyol and the curing agent within a range not to impair the effects of the present invention.

Such other components may be known additives for a coating material and may, for example, be a coalescer, an inorganic coloring pigment, an organic coloring pigment, an extender pigment, a curing catalyst, a plasticizer, a preservative, a fungicide, a defoaming agent, a leveling agent, a pigment dispersing agent, an anti-settling agent, an anti-sagging agent, a delustering agent, an ultraviolet absorber or an antioxidant. The aqueous coating composition of the present invention may contain two or more types of such other components.

(Advantageous Effects)

Since the above-described aqueous coating composition of the present invention contains a specific urethane polyol having a highly hydrophilic group (such as a hydroxy group), a self-cleaning function can be imparted to the surface of a coated film. That is, by the urethane polyol having a highly hydrophilic group, hydrophilicity can be imparted to the surface of a coated film. By the improved hydrophilicity on the surface of a coated film, stains attached to the surface of a coated film will easily be washed off by water droplets of rainfall, etc. (easy washing property).

Further, it is considered that since the above-described aqueous coating composition of the present invention contains a urethane polyol (X), in a case where an aqueous fluorinated resin dispersion is blended as the aqueous synthetic resin dispersion in the aqueous coating composition, the urethane polyol (X) is likely to migrate to the surface layer of a coated film, and a self-cleaning function can sufficiently be imparted to a coated film. Further, it is considered that even in a case where an isocyanate compound is blended as a curing agent in the aqueous coating composition, the urethane polyol (X) is less likely to react with the isocyanate compound in the process of migration of the urethane polyol (X) to the surface layer of a coated film, and migration of the urethane polyol to the surface layer of a coated film will not be impaired, and thus the self-cleaning function can sufficiently be imparted to a coated film effectively.

Further, in the above-described aqueous coating composition of the present invention, since the urethane polyol (X) does not have a high reactivity for example like an alkoxysilane-modified condensate, even if the urethane polyol (X) is blended in the aqueous coating composition, the storage stability of the aqueous coating composition is less likely to be impaired.

Further, the above-described aqueous coating composition of the present invention is an aqueous coating composition having a low content of an organic solvent, such being favorable in view of environment.

<Aqueous Coating Material Kit>

The aqueous coating material kit of the present invention comprises two liquids i.e. the aqueous coating composition of the present invention and an aqueous solution or aqueous dispersion of an isocyanate compound in a state where they are not mixed with each other, and by mixing them, an aqueous coating composition containing an isocyanate compound can be prepared. In a case where a coating additive is blended in the aqueous coating composition, it may properly be contained in one or both of the two liquids.

The aqueous coating composition to be combined with the isocyanate compound may contain a curing agent other than the isocyanate compound, however, usually an aqueous coating composition containing no curing agent is used.

(Advantageous Effects)

Since the above-described aqueous coating material kit of the present invention comprises the aqueous coating composition of the present invention and an aqueous solution or aqueous dispersion of an isocyanate compound, the aqueous coating composition of the present invention containing an isocyanate compound having the above-described effects can be prepared.

<Kit for Preparation of Aqueous Coating Material>

The kit for preparation of an aqueous coating material of the present invention comprises two liquids i.e. an aqueous synthetic resin dispersion and a solution or dispersion of a urethane polyol (X) in a state where they are not mixed with each other, and by mixing them, an aqueous coating composition can be prepared. In a case where a coating additive is blended in the aqueous coating composition, it may properly be contained in one or both of the two liquids.

A curing agent may preliminarily be blended in the aqueous synthetic resin dispersion to be combined with the urethane polyol (X), a curing agent may be blended after both the components of the kit for preparation of an aqueous coating material are mixed, or both the components of the kit for preparation of an aqueous coating material and a curing agent may be simultaneously mixed. Further, in a case where an aqueous coating composition containing no curing agent is used for coating, both the components of the kit for preparation of an aqueous coating material are mixed to prepare an aqueous coating composition containing no curing agent, which is used for coating.

In a case where a curing agent is further blended in the aqueous coating composition of the present invention, the aqueous coating composition preferably comprises three liquids i.e. an aqueous synthetic resin dispersion, an aqueous solution or aqueous dispersion of a curing agent and a solution or dispersion of a urethane polyol (X) in a state where they are not mixed with one another. By mixing the three liquids, an aqueous coating composition can be prepared. In a case where a coating additive is blended in the aqueous coating composition, it may properly be contained in at least one of the three liquids. The curing agent is preferably an isocyanate compound.

The amount of the solution of dispersion of the urethane polyol (X) is preferably such that the amount of the urethane polyol (X) in the solution or dispersion is from 0.5 to 30 parts by mass, more preferably from 5 to 20 parts by mass per 100 parts by mass of the solid content in the aqueous synthetic resin dispersion.

(Advantageous Effects)

Since the above-described kit for preparation of an aqueous coating material of the present invention comprises an aqueous synthetic resin dispersion and a urethane polyol, the aqueous coating composition of the present invention having the above-described effects can be prepared.

<Article having Coated Film>

The article of the present invention has a coated film formed by using the aqueous coating composition of the present invention.

The article of the present invention may be produced by applying the aqueous coating composition of the present invention to the surface of a substrate, followed by drying to form a coated film on the surface of the substrate.

The substrate may, for example, be a metal, glass, a porcelain tile, concrete, a siding board, an extruded board or a plastic, and is suitably a frame of buildings, civil engineering structures, etc. In factories or the like, the surface of a building material before assembled into a frame may be pre-coated with the aqueous coating composition.

The aqueous coating composition of the present invention may be directly applied to a substrate, or a substrate is subjected to a known surface treatment (such as base treatment) and then the aqueous coating composition is applied. As the application method, brush coating, a spray, a roller, a roll coater or a flow coater may, for example, be mentioned.

(Advantageous Effects)

The above-described article of the present invention comprises a coated film made of the aqueous coating composition of the present invention having the above-described effects, which has a sufficient self-cleaning function.

EXAMPLES

Now, the present invention will be described in further detail with reference to Examples. However, it should be understood that the present invention is by no means restricted such specific Examples.

(Contact Angle of Coated Film)

The contact angle when droplets of water were dropped on a coated film in the air was measure by a contact angle meter (manufactured by Kyowa Interface Science Co., Ltd., CA-X model). A lower water contact angle indicates higher hydrophilicity.

(Weather Resistance Test)

A test plate was installed outside in Naha, Okinawa, and the gloss retention of a coated film and the stain on the coated film were evaluated by comparison between immediately before installation and one year later.

Gloss Retention of Coated Film

The gloss on the surface of the coated film was measured by a gloss meter (manufactured by NIPPON DENSHOKU INDUSTRIES CO., LTD., PG-1M), and the weather resistance was evaluated based on the following standards.

◯: A gloss retention of at least 80%.

x: A gloss retention of less than 80%.

Stain on Coated Film

The degree of stain was visually confirmed based on the following standards:

◯: No outstanding stain confirmed on the surface of the coated film.

x: Stain attached on the entire surface of the coated film.

(Monomer)

Monomer (m1)

CTFE: Chlorotrifluoroethylene

Monomer (m2)

CM-EOVE: $CH_2$=$CHOCH_2$-cyclo$C_6H_{10}$—$CH_2$($OCH_2CH_2$)$_k$OH (number average molecular weight: 830)

Monomer (m3)

CHMVE: $CH_2$=$CHOCH_2$-cyclo$C_6H_{10}$—$CH_2OH$

Monomer (m4)

CHVE: Cyclohexyl vinyl ether

2-EHVE: 2-Ethylhexyl vinyl ether

EVE: Ethyl vinyl ether

Monomer (b1)

CTFE: Chlorotrifluoroethylene

Monomer (b2)

EVE: Ethyl vinyl ether

CHVE: Cyclohexyl vinyl ether

Monomer (b3)

4-HBVE: 4-Hydroxybutyl vinyl ether (Urethane Polyol)

As a solution of a urethane polyol, an aqueous solution of urethanediol (manufactured by King Industries Inc., FLEXOREZ (registered trademark) UD-350W, solid content concentration: 88 mass %, average number of residues of aliphatic diisocyanate of urethanediol: 10, number average molecular weight: 5,500, hydroxy value: 350 mgKOH/g) was prepared.

The above FLEXOREZ (registered trademark) UD-350W is considered to be a urethanediol made of a reaction product of dipropylene glycol and 2-methylpentane-1,5-diisocyanate.

Preparation Example 1

Preparation of Aqueous Fluorinated Resin Dispersion (A1-1)

Into an autoclave made of stainless steel having an internal capacity of 2,500 mL equipped with a stirrer, 1,280 g of water, 415 g of CHVE, 230 g of 2-EHVE, 21 g of CM-EOVE, 34 g of CHMVE, 1,280 g of deionized water, 3.0 g of potassium carbonate, 5.4 g of ammonium persulfate, 33 g of a nonionic emulsifier (manufactured by NIPPON NYUKAZAI CO., LTD., Newcol (registered trademark)-2320) and 1.4 g of an anionic emulsifier (sodium lauryl sulfate) were charged and cooled with water, and the autoclave was pressurized to 0.4 MPaG with nitrogen gas and deaerated. Such pressurization and deaeration were repeated twice. The autoclave was deaerated to 0.095 MPaG to remove dissolved air, and 580 g of CTFE was charged, followed by reaction at 50° C. for 24 hours. After the reaction was conducted 24 hours, the autoclave was cooled with water to terminate the reaction. The resulting reaction liquid was cooled to room temperature, and unreacted monomers were purged to obtain aqueous fluorinated resin dispersion (A1-1) having a solid content concentration of 50 mass %. The hydroxy value of fluorinated copolymer (A1p-1) contained in the dispersion was 10 mgKOH/g. The ratio of structural units of fluorinated copolymer (A1p-1) was CTFE units/CM-EOVE units/CHMVE units/CHVE units/2-EHVE units=50/0.25/2/33/14.75 (molar ratio).

Preparation Example 2

Preparation of Aqueous Fluorinated Resin Dispersion (A1-2)

Into an autoclave made of stainless steel having an internal capacity of 2,500 mL equipped with a stirrer, 1,280 g of water, 185 g of EVE, 244 g of CHVE, 47 g of CM-EOVE, 194 g of CHMVE, 1,280 g of deionized water, 2.0 g of potassium carbonate, 1.3 g of ammonium persulfate, 33 g of a nonionic emulsifier (manufactured by NIPPON NYUKAZAI CO., LTD., Newcol (registered trademark)-2320) and 1.4 g of an anionic emulsifier (sodium lauryl sulfate) were charged and cooled with water, and the autoclave was pressurized to 0.4 MPaG with nitrogen gas and deaerated. Such pressurization and deaeration were repeated twice. The autoclave was deaerated to 0.095 MPaG to remove dissolved air, and 664 g of CTFE was charged, followed by reaction at 50° C. for 24 hours. After the reaction was conducted 24 hours, the autoclave was cooled with water to terminate the reaction. The resulting reaction liquid was cooled to room temperature, and unreacted monomers were purged to obtain aqueous fluorinated resin dispersion (A1-2) having a solid content concentration of 50 mass %. The hydroxy value of fluorinated copolymer (A1p-2) contained in the dispersion was 55 mgKOH/g. The ratio of structural units of fluorinated copolymer (A1p-2) was CTFE units/CM-EOVE units/CHMVE units/EVE units/CHVE units=50/0.5/10/17/22.5 (molar ratio).

Preparation Example 3

Preparation of Aqueous Fluorinated Resin Dispersion (A2-1)

Fluorinated copolymer (B) (manufactured by Asahi Glass Company, Limited, LUMIFLON (registered trademark) flakes, CTFE units/EVE units/CHVE units/4-HBVE units=50/15/15/20 (molar ratio), hydroxy value: 100 mgKOH/g, mass average molecular weight: 7,000) was dissolved in methyl ethyl ketone (MEK) to obtain a varnish having a solid content of 60 mass %.

To 300 g of such varnish, 4.8 g of succinic anhydride and 0.072 g of triethylamine as a catalyst were added, followed by reaction at 70° C. for 6 hours for esterification. An infrared absorption spectrum of the resulting reaction liquid was measured, whereupon characteristic absorptions (1,850 cm$^{-1}$, 1,780 cm$^{-1}$) of the succinic anhydride which had been measured before the reaction disappeared after the reaction, and absorptions of a carboxy group (1,710 cm$^{-1}$) and an ester bond (1,735 cm$^{-1}$) were observed. The hydroxy value of the fluorinated copolymer (B) after esterification was 85 mg/KOH, and the acid value was 15 mgKOH/g.

Then, to the fluorinated copolymer (B) after esterification, 4.9 g of triethylamine was added, followed by stirring at room temperature for 20 minutes to neutralize a carboxy group, and 180 g of deionized water was gradually added.

Finally, acetone and methyl ethyl ketone were distilled off under reduced pressure. Aqueous fluorinated resin dispersion (A2-1) having a solid content concentration of 50 mass % was prepared with deionized water. The ratio of structural units of fluorinated copolymer (A2p-1) was CTFE units/EVE units/CHVE units/4-HBVE units/esterified 4-HBVE units=50/15/15/17/3 (molar ratio). The proportion of the esterified 4-HBVE units being neutralized with triethylamine was 70 mol %.

Preparation Example 4

Preparation of Pigment Composition

210 Parts by mass of titanium oxide (manufactured by SAKAI CHEMICAL INDUSTRIES CO., LTD., D-918), 21 parts by mass of a pigment dispersing agent (manufactured by BYK Chemie, Disperbyk (registered trademark) 190, a copolymer having affinity with a pigment, acid value: 10 mgKOH/g), 4.5 parts by mass of a defoaming agent (manufactured by Cognis Japan Ltd., DEHYDRAN (registered trademark) 1620), 64.5 parts by mass of deionized water and 300 parts by mass of glass beads were mixed for dispersion with a dispersing machine, and the glass beads were removed by filtration to prepare a pigment composition.

Example 1

To 55 g of the pigment composition obtained in Preparation Example 4, 193 g of aqueous fluorinated resin dispersion (A1-1) obtained in Preparation Example 1, 15 g of 2,2,4-trimethyl-1,3-pentadiol mono(2-methyl propanoate) as a coalescer, 0.5 g of a thickener (manufactured by by Akzo Nobel, BERMODOL (registered trademark) 2150) and 15 g of an urethane polyol solution were added and mixed to prepare an aqueous coating composition. The amount of the urethanediol was 16.3 parts by mass per 100 parts by mass of a solid content in aqueous fluorinated resin dispersion (A1-1).

The obtained aqueous coating composition was applied to an aluminum plate (thickness: 1 mm, surface treated with chromate) by means of a film applicator so that the dry film thickness would be 40 μm, and dried at a temperature of 23° C. under a humidity of 50% for 2 weeks to prepare a test specimen. Evaluation results with respect to the obtained test specimen are shown in Table 1.

Example 2

To 55 g of the pigment composition obtained in Preparation Example 4, 193 g of aqueous fluorinated resin dispersion (A1-2) obtained in Preparation Example 2, 15 g of dipropylene glycol mono-n-butyl ether as a coalescer, 0.5 g of a thickener (manufactured by Akzo Nobel, BERMODOL (registered trademark) 2150), 15 g of a urethane polyol solution and 22.9 g of a water-dispersed isocyanate curing agent (manufactured by Sumika Bayer Urethane Co., Ltd., BAYHYDUR (registered trademark) 3100) were added and mixed to prepare an aqueous coating composition. The amount of the urethanediol was 16.3 parts by mass per 100 parts by mass of the solid content in aqueous fluorinated resin dispersion (A1-2).

A test specimen was prepared in the same manner as in Example 1. The evaluation results with respect to the obtained test specimen are shown in Table 1.

Example 3

To 55 g of the pigment composition obtained in Preparation Example 4, 193 g of aqueous fluorinated resin dispersion (A2-1) obtained in Preparation Example 3, 1.3 g of a surface modifier (manufactured by BYK Chemie, BYK (registered trademark)-348), 0.5 g of a thickener (manufactured by Akzo Nobel, BERMODOL (registered trademark) 2150), 15 g of a urethane polyol solution and 25 g of a water-dispersed isocyanate curing agent (manufactured by Sumika Bayer Urethane Co., Ltd., BAYHYDUR (registered trademark) 3100) were added and mixed to prepare an aqueous coating composition. The amount of the urethanediol was 16.3 parts by mass per 100 parts by mass of the solid content in aqueous fluorinated resin dispersion (A2-1).

A test specimen was prepared in the same manner as in Example 1. The evaluation results with respect to the obtained test specimen are shown in Table 1.

Example 4

To 55 g of the pigment composition obtained in Preparation Example 4, 193 g of an aqueous fluorinated resin dispersion (manufactured by Arkema, tradename "Kynar Aquatec FMA-12"), 15 g of 2,2,4-trimethyl-1,3-pentadiol mono(2-methylpropanoate) as a coalescer, 0.5 g of a thickener (manufactured by Akzo Nobel, BERMODOL (registered trademark) 2150) and 15 g of a urethane polyol solution were added and mixed to prepare an aqueous coating composition. The amount of urethanediol was 16.3 parts by mass per 100 parts by mass of the solid content in the aqueous fluorinated resin dispersion.

The obtained aqueous coating composition was applied to an aluminum plate (thickness: 1 mm, surface treated with chromate) by means of a film applicator so that the dry film thickness would be 40 μm, and dried at a temperature of 23° C. under a humidity of 50% for 2 weeks to prepare a test specimen. The evaluation results with respect to the obtained test specimen are shown in Table 1.

Comparative Example 1

An aqueous coating composition was prepared in the same manner as in Example 1 except that the urethane polyol solution was not added.

A test specimen was prepared in the same manner as in Example 1. The evaluation results with respect to the obtained test specimen are shown in Table 1.

Comparative Example 2

An aqueous coating composition was prepared in the same manner as in Example 2 except that the urethane polyol solution was not added.

A test specimen was prepared in the same manner as in Example 1. The evaluation results with respect to the obtained test specimen are shown in Table 1.

Comparative Example 3

An aqueous coating composition was prepared in the same manner as in Example 3 except that the urethane polyol solution was not added.

A test specimen was prepared in the same manner as in Example 1. The evaluation results with respect to the obtained test specimen are shown in Table 1.

Comparative Example 4

An aqueous coating composition was prepared in the same manner as in Example 4 except that the urethane polyol solution was not added.

A test specimen was prepared in the same manner as in Example 1. The evaluation results with respect to the obtained test specimen are shown in Table 1.

Comparative Example 5

To 55 g of the pigment composition obtained in Preparation Example 4, 193 g of aqueous fluorinated resin dispersion (A2-1) obtained in Preparation Example 3, 1.3 g of a surface modifier (manufactured by BYK Chemie, BYK (registered trademark)-348), 0.5 g of a thickener (manufactured by Akzo Nobel, BERMODOL (registered trademark) 2150), 25 g of a water-dispersed isocyanate curing agent (manufactured by Sumika Bayer Urethane Co., Ltd., BAYHYDUR (registered trademark) 3100), 27.6 g of a stain-proofing agent for an aqueous coating material (manufactured by Asahi Glass Company, Limited, tradename "SRAgent2100", solid content concentration: 40 mass %) and 6.9 g of adipic acid dihydrazide (10 mass % diluted product) were added and mixed to prepare an aqueous coating composition.

The amount of the stain-proofing agent for an aqueous coating material (manufactured by Asahi Glass Company, Limited, tradename: "SRAgent2100") was 14.3 parts by mass per 100 parts by mass of the solid content in aqueous fluorinated resin dispersion (A2-1).

A test specimen was prepared in the same manner as in Example 1. The evaluation results with respect to the obtained test specimen are shown in Table 1.

TABLE 1

| | Water contact angle | Gloss retention | Stain on coated film |
|---|---|---|---|
| Example 1 | 16.4° | ○ | ○ |
| Example 2 | 24.7° | ○ | ○ |
| Example 3 | 8.3° | ○ | ○ |
| Example 4 | 14.5° | ○ | ○ |
| Comparative Example 1 | 70.1° | ○ | X |
| Comparative Example 2 | 67.8° | ○ | X |

TABLE 1-continued

|  | Water contact angle | Gloss retention | Stain on coated film |
|---|---|---|---|
| Comparative Example 3 | 77.4° | ○ | X |
| Comparative Example 4 | 70.3° | ○ | X |
| Comparative Example 5 | 70.3° | ○ | X |

As evident from the results in Table 1, the water contact angle was low in each of Examples 1 to 4 as compared with Comparative Examples 1 to 4 in which the aqueous coating composition did not contain a urethane polyol and Comparative Example 5 in which the aqueous coating composition contained a conventional stain-proofing agent for an aqueous coating material. Further, with respect to the state of stain on the exposed plate, substantially no stain was attached to each of the test plates in Examples 1 to 4. Accordingly, it was found that in Examples 1 to 4, hydrophilicity of a coated film was improved, and the self-cleaning function on the coated film surface was improved as compared with Comparative Examples 1 to 5.

INDUSTRIAL APPLICABILITY

The aqueous coating composition of the present invention is useful as e.g. a coating material for exterior of e.g. a building to which stains such as dust are likely to be attached by rain and wind.

What is claimed is:

1. An aqueous coating composition, which comprises an aqueous synthetic resin dispersion and a urethane polyol,
wherein the urethane polyol is a reaction product of a polyoxyalkylene diol having as units an oxyalkylene group of a structure such that an oxygen atom is bonded to one end of a branched alkylene group, and an aliphatic diisocyanate,
wherein at least part of the synthetic resin in the aqueous synthetic resin dispersion is a fluorinated resin, and
wherein a hydroxy value of the fluorinated resin is at least 20 mgKOH/g,
and wherein:
the fluorinated resin is a fluorinated copolymer (A1p) having structural units based on the following monomer (m1), structural units based on the following monomer (m2) and structural units based on the following monomer (m3):
monomer (m1): a fluoroolefin,
monomer (m2): a macromonomer having a hydrophilic moiety, and
monomer (m3): a hydroxy group-containing monomer represented by the following formula (m3):

$$R^1-R^2-OH \qquad (m3)$$

wherein $R^1$ is a group having a radical polymerizable unsaturated group, and
$R^2$ is a n-nonylene group or a cyclohexane-1,4-dimethylene group; or
the fluorinated resin is a fluorinated copolymer (A2p) having from 40 to 60 mol % of structural units represented by the following formula (a1), from 3 to 50 mol% of structural units represented by the following formula (a2), from 4 to 30 mol % of structural units represented by the following formula (a3) and from 0.4 to 7 mol % of structural units represented by the following formula (a4), with the proviso that the total amount of the structural units represented by the formula (a1), the structural units represented by the formula (a2), the structural units represented by the formula (a3) and the structural units represented by the formula (a4) is from 80 to 100 mol %:

wherein each of $X^1$ and $X^2$ which are independent of each other, is a hydrogen atom, a chlorine atom or a fluorine atom, $X^3$ is a hydrogen atom, a chlorine atom, a fluorine atom or $-CY^1Y^2Y^3$, and each of $Y^1$, $Y^2$ and $Y^3$ which are independent of one another, is a hydrogen atom, a chlorine atom or a fluorine atom,

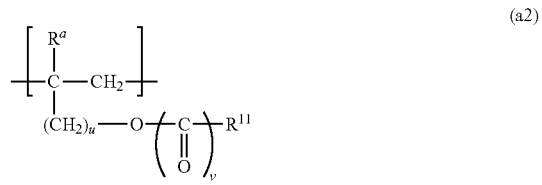

wherein $R^a$ is a hydrogen atom or a methyl group, $R^{11}$ is a $C_{1-12}$ alkyl group or a $C_{4-10}$ monovalent alicyclic group, u is an integer of from 0 to 8, and v is 0 or 1,

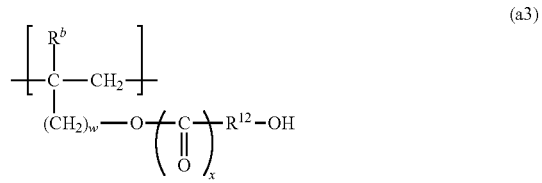

wherein $R^b$ is a hydrogen atom or a methyl group, $R^{12}$ is a $C_{1-10}$ alkylene group or a $C_{4-10}$ bivalent alicyclic group, w is an integer of from 0 to 8, and x is 0 or 1,

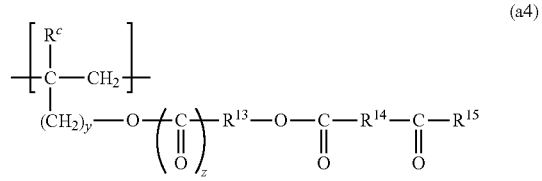

wherein $R^c$ is a hydrogen atom or a methyl group, $R^{13}$ is a $C_{1-10}$ alkylene group or a $C_{4-10}$ bivalent alicyclic group, $R^{14}$ is a $C_{2-10}$ alkylene group or a $C_{4-10}$ bivalent alicyclic group, $R^{15}$ is $-OH$ or $-O^{-+}NHZ^1Z^2Z^3$, each of $Z^1$, $Z^2$ and $Z^3$ which are independent of one another, is a hydrogen atom, a $C_{1-4}$ alkyl group or a $C_{1-6}$ hydroxyalkyl group, at least some of $R^{15}$ are
$-O^{-+}NHZ^1Z^2Z^3$, y is an integer of form 0 to 8, and z is 0 or 1.

2. The aqueous coating composition according to claim 1, wherein the oxyalkylene group is an oxypropylene group.

3. The aqueous coating composition according to claim 1, wherein the urethane polyol is a reaction product of polypropylene glycol having 2 to 6 oxypropylene groups, and an alkylene diisocyanate having a $C_{4-10}$ alkylene group.

4. The aqueous coating composition according to claim 3, wherein the alkylene group of the alkylene diisocyanate is a branched alkylene group.

5. The aqueous coating composition according to claim 1, wherein the urethane polyol has a number average molecular weight of from 1,000 to 30,000 and a hydroxy value of from 50 to 500 mgKOH/g.

6. The aqueous coating composition according to claim 1, wherein the content of the urethane polyol is from 0.5 to 30 parts by mass per 100 parts by mass of the solid content in the aqueous synthetic resin dispersion.

7. The aqueous coating composition according to claim 1, which further contains a curing agent.

8. The aqueous coating composition according to claim 7, wherein the curing agent is an isocyanate compound.

9. An article having a coated film formed by coating the article with the aqueous coating composition according to claim 1.

10. An aqueous coating material kit comprising the aqueous coating composition according to claim 1, and an aqueous solution or aqueous dispersion of an isocyanate compound.

11. An article having a coated film formed by coating the article with the aqueous coating material kit according to claim 10.

12. A kit for preparation of an aqueous coating material, to be used to prepare the aqueous coating composition as defined in claim 1, which comprises the aqueous synthetic resin dispersion and an aqueous solution or aqueous dispersion of the urethane polyol.

13. An aqueous coating composition, which comprises an aqueous synthetic resin dispersion and a urethane polyol,
wherein the urethane polyol is a reaction product of a polyoxyalkylene diol having as units an oxyalkylene group of a structure such that an oxygen atom is bonded to one end of a branched alkylene group, and an aliphatic diisocyanate,
wherein the alkylene group of the alkylene diisocyanate is a branched alkylene group.

14. The aqueous coating composition according to claim 13, wherein the urethane polyol is a reaction product of polypropylene glycol having 2 to 6 oxypropylene groups, and an alkylene diisocyanate having a $C_{4-10}$ alkylene group.

15. The aqueous coating composition according to claim 13, wherein the urethane polyol has a number average molecular weight of from 1,000 to 30,000 and a hydroxy value of from 50 to 500 mgKOH/g.

16. The aqueous coating composition according to claim 13, wherein the content of the urethane polyol is from 0.5 to 30 parts by mass per 100 parts by mass of the solid content in the aqueous synthetic resin dispersion.

17. The aqueous coating composition according to claim 13, wherein at least part of the synthetic resin in the aqueous synthetic resin dispersion is a fluorinated resin.

18. The aqueous coating composition according to claim 17, wherein the fluorinated resin is a fluorinated copolymer (A1p) having structural units based on the following monomer (m1), structural units based on the following monomer (m2) and structural units based on the following monomer (m3):

monomer (m1): a fluoroolefin, monomer (m2): a macromonomer having a hydrophilic moiety, and monomer (m3): a hydroxy group-containing monomer represented by the following formula (m3):

$$R^1-R^2-OH \qquad (m3)$$

wherein $R^1$ is a group having a radical polymerizable unsaturated group, and $R^2$ is a n-nonylene group or a cyclohexane-1,4-dimethylene group.

19. The aqueous coating composition according to claim 17, wherein the fluorinated resin is a fluorinated copolymer (A2p) having from 40 to 60 mol % of structural units represented by the following formula (a1), from 3 to 50 mol % of structural units represented by the following formula (a2), from 4 to 30 mol % of structural units represented by the following formula (a3) and from 0.4 to 7 mol % of structural units represented by the following formula (a4), with the proviso (provided that the total amount of the structural units represented by the formula (a1), the structural units represented by the formula (a2), the structural units represented by the formula (a3) and the structural units represented by the formula (a4) is from 80 to 100 mol %:

(a1)

wherein each of $X^1$ and $X^2$ which are independent of each other, is a hydrogen atom, a chlorine atom or a fluorine atom, $X^3$ is a hydrogen atom, a chlorine atom, a fluorine atom or —$CY^1Y^2Y^3$, and each of $Y^1$, $Y^2$ and $Y^3$ which are independent of one another, is a hydrogen atom, a chlorine atom or a fluorine atom,

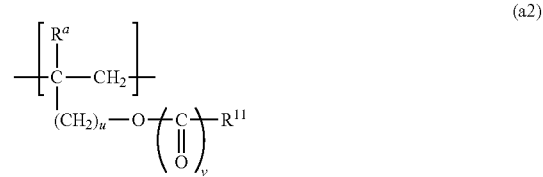

(a2)

wherein $R^a$ is a hydrogen atom or a methyl group, $R^{11}$ is a $C_{1-12}$ alkyl group or a $C_{4-10}$ monovalent alicyclic group, u is an integer of from 0 to 8, and v is 0 or 1,

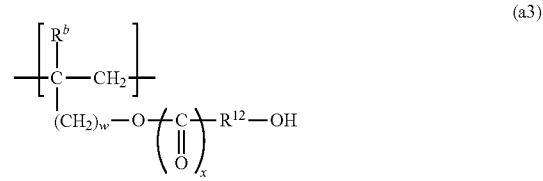

(a3)

wherein $R^b$ is a hydrogen atom or a methyl group, $R^{12}$ is a $C_{1-10}$ alkylene group or a $C_{4-10}$ bivalent alicyclic group, w is an integer of from 0 to 8, and x is 0 or 1,

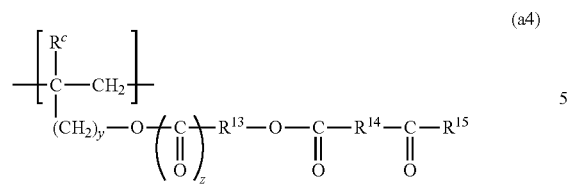

(a4)

wherein $R^c$ is a hydrogen atom or a methyl group, $R^{13}$ is a $C_{1-10}$ alkylene group or a $C_{4-10}$ bivalent alicyclic group, $R^{14}$ is a $C_{2-10}$ alkylene group or a $C_{4-10}$ bivalent alicyclic group, $R^{15}$ is —OH or —O$^{-+}$NHZ$^1$Z$^2$Z$^3$, each of $Z^1$, $Z^2$ and $Z^3$ which are independent of one another, is a hydrogen atom, a $C_{1-4}$ alkyl group or a $C_{1-6}$ hydroxyalkyl group, at least some of $R^{15}$ are —O$^{-+}$NHZ$^1$Z$^2$Z$^3$, y is an integer of form 0 to 8, and z is 0 or 1.

20. The aqueous coating composition according to claim 13, which further comprises a curing agent.

* * * * *